(12) United States Patent
Zubieta Andueza

(10) Patent No.: US 11,332,214 B2
(45) Date of Patent: May 17, 2022

(54) CASSETTE FOR A BICYCLE TRANSMISSION SYSTEM AND SPROCKET FOR A CASSETTE FOR A BICYCLE TRANSMISSION SYSTEM

(71) Applicant: ZUMA INNOVATION, S.L., Galdakao (ES)

(72) Inventor: Mikel Zubieta Andueza, Galdakao (ES)

(73) Assignee: ZUMA INNOVATION, S.L., Galdakao (ES)

( * ) Notice: Subject to any disclaimer, the term of this patent is extended or adjusted under 35 U.S.C. 154(b) by 318 days.

(21) Appl. No.: 16/500,891

(22) PCT Filed: Apr. 6, 2018

(86) PCT No.: PCT/EP2018/058856
§ 371 (c)(1),
(2) Date: Oct. 4, 2019

(87) PCT Pub. No.: WO2018/185283
PCT Pub. Date: Oct. 11, 2018

(65) Prior Publication Data
US 2020/0122805 A1    Apr. 23, 2020

(30) Foreign Application Priority Data
Apr. 7, 2017 (EP) .................................. 17382193

(51) Int. Cl.
*B62M 9/10* (2006.01)
*F16H 55/30* (2006.01)
(52) U.S. Cl.
CPC .............. *B62M 9/10* (2013.01); *F16H 55/30* (2013.01)
(58) Field of Classification Search
CPC .................................. B62M 9/10; F16H 55/30
(Continued)

(56) References Cited

U.S. PATENT DOCUMENTS 4,380,445 A * 4/1983 Shimano ................ B62M 9/105
474/144
5,503,600 A * 4/1996 Berecz ..................... B62M 9/10
474/160
(Continued)

FOREIGN PATENT DOCUMENTS

DE  102016004817  12/2016
EP      1043221   10/2000
(Continued)

OTHER PUBLICATIONS

International Search Report and Written Opinion prepared by the European Patent and Trademark Office for International (PCT) Patent Application No. PCT/US18/58856, dated May 30, 2018.

*Primary Examiner* — Gene O Crawford
*Assistant Examiner* — Emily Rose Kincaid
(74) *Attorney, Agent, or Firm* — Sheridan Ross P.C.

(57) ABSTRACT

Cassette (1) for a bicycle transmission system, which comprises a first sprocket (P1) and a second sprocket (P2) smaller than the first sprocket (P1) and a support structure (S) the sprockets (P1, P2), being the inner edges (CI1, CI2) of the sprockets (P1, P2) configured by grooved surfaces (P11, P21), being the support structure (S) provided with two engagement surfaces (S1, S2) complementary of the grooved surfaces (P11, P21) of the grooved sprockets (P1, P2), such that tangential forces (T) can be transmitted between the sprockets and the support structure (S), comprising the cassette at least a spacer (E1-2, E2-3, E3-4 . . . ) between sprockets (P1, P2), wherein the base line (B2) of the second sprocket (P2) is smaller than the average diameter (D1) of the grooved surface (P11) of the first sprocket (P1), extending the spacer (E1-2) between the first sprocket (P1) and the second sprocket (P2) at least from the grooved surface (P11) of the first sprocket (P1) to at least the base line
(Continued)

(B2) of the second sprocket (P2), such that the spacer (E1-2) allows to exert axial forces (A) on the first sprocket (P1).

13 Claims, 19 Drawing Sheets

(58) Field of Classification Search
USPC .......................................................... 474/160
See application file for complete search history.

(56) References Cited

U.S. PATENT DOCUMENTS

| | | | | |
|---|---|---|---|---|
| 5,876,296 | A * | 3/1999 | Hsu | B62M 9/10 |
| | | | | 474/160 |
| 6,022,284 | A * | 2/2000 | Bartolozzi | B62M 9/105 |
| | | | | 474/122 |
| 8,360,911 | B2 * | 1/2013 | Braedt | B62M 9/10 |
| | | | | 474/164 |
| 8,641,151 | B2 * | 2/2014 | Kamada | B62M 9/125 |
| | | | | 301/110.5 |
| 9,168,976 | B1 | 10/2015 | Earle et al. | |
| 9,738,349 | B2 * | 8/2017 | Braedt | F16D 1/108 |
| 9,791,033 | B2 * | 10/2017 | Wickliffe | F16H 55/303 |
| 2010/0075791 | A1 * | 3/2010 | Braedt | B62M 9/10 |
| | | | | 474/160 |
| 2011/0319209 | A1 * | 12/2011 | Huang | B62M 9/105 |
| | | | | 474/164 |
| 2014/0335983 | A1 | 11/2014 | Iwai et al. | |
| 2016/0272002 | A1 * | 9/2016 | Earle | B21D 53/28 |
| 2016/0347410 | A1 * | 12/2016 | Watarai | F16H 55/30 |
| 2017/0057598 | A1 | 3/2017 | Thrash et al. | |

FOREIGN PATENT DOCUMENTS

| | | |
|---|---|---|
| EP | 2452865 | 5/2012 |
| FR | 2281869 | 3/1976 |
| FR | 2612870 | 9/1988 |
| JP | S54-165955 | 11/1979 |

* cited by examiner

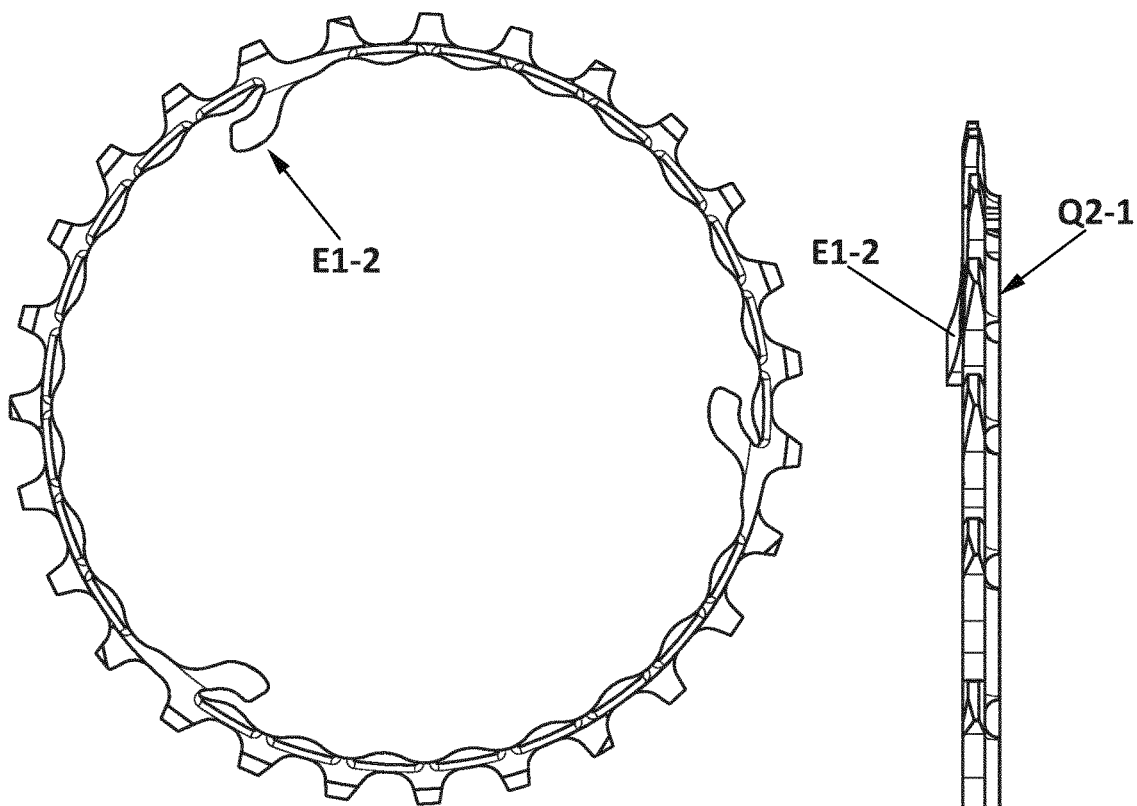
FIG. 9
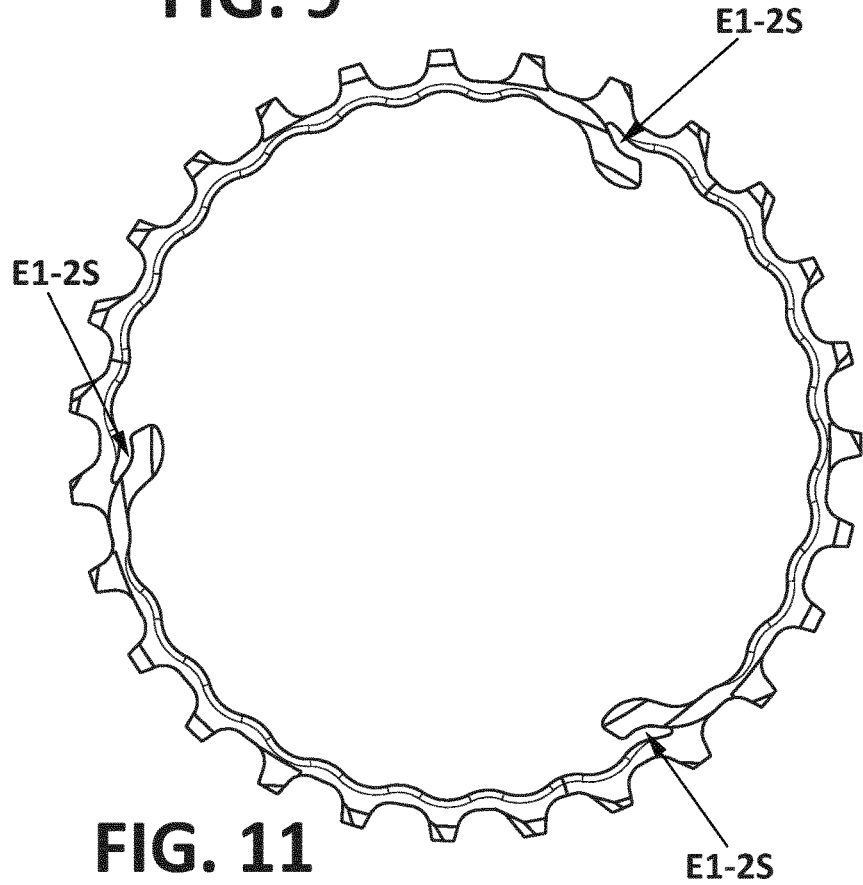
FIG. 11
FIG. 10

CASSETTE FOR A BICYCLE TRANSMISSION SYSTEM AND SPROCKET FOR A CASSETTE FOR A BICYCLE TRANSMISSION SYSTEM

CROSS-REFERENCE TO RELATED APPLICATION

This application is a national stage application under 35 U.S.C. 371 and claims the benefit of PCT Application No. PCT/EP2018/058856 having an international filing date of 6 Apr. 2018, which designated the United States, which PCT application claimed the benefit of European Patent Application No. 17382193.5 filed 7 Apr. 2017, the disclosures of each of which are incorporated by reference herein.

TECHNICAL SECTOR

The present invention is related to the cassettes used for a bicycle transmission system in which the sprockets are interchangeable teethed gears mounted on a supporting element.

BACKGROUND

Power transmission in a bicycle is usually done through a chain that goes from the pedal ensemble where the cyclist applies force to the cassette ensemble, and then the cassette ensemble transmits power to the wheel ensemble through a mechanism that only allows power transmission in one rotational direction. Each ensemble can be considered as a rigid solid during operation even if in practice they are composed by several tightly joined elements.

The contact of the cassette ensemble on both sides, with the chain and with the freewheel mechanism, is intermittent, therefore wear with use occurs in both cases. Wear in the freewheel mechanism is reduced, and in general this element can stand the whole bicycle lifetime without the need of substituting it.

However, wear of the sprockets in contact with the chain is significant and requires periodic substitutions. Because of this and in order to simplify these substitution processes, the cassette ensemble is usually divided into two sub-ensembles:

1. Freewheel body: it is the part of the cassette ensemble that transmits power to the freewheel mechanism. It is not a consumable. It is usually part of the product unit known as hub which comprises also the hub body, the part of the wheel ensemble that is in contact with the freewheel mechanism, as well as the freewheel mechanism itself. In this manner, each hub manufacturer incorporates its own freewheel mechanism that is seldom compatible with that of the competition. However, the surface of the freewheel body meets certain standard geometries and dimensions to be compatible with cassettes from different brands. At present, there are three main standards in the market:

a. The most common grooved system for rotational power transmission between the cassette and the freewheel body is the one shown as an example in Shimano's document US 2006/0258499 A1. There are different length versions of this grooved system for cassettes with a different number of sprockets.

b. A less extended grooved system but with some presence in the road bicycle market is the one by Campagnolo (US 2010/0260544 A1).

c. Another grooved system with a more limited use, for mountain bikes in this case, is the one proposed by Sram (US 2013/0017914 A1).

2. Cassette: it is the ensemble that incorporates the sprockets, which are the elements in contact with the chain, as well as the means to secure it to the freewheel body. It is a consumable. As described above, at present there are three grooved system geometries for securing the cassette to the freewheel body: the standards by Shimano, by Campagnolo and by Sram. Regarding the geometry of the sprockets, each cassette manufacturer incorporates its own details, but in general the compatibility between cassettes and chains from different brands is high.

In order to avoid early wear the sprocket material must be hard, so must the chain be, therefore the material used for these components nearly in all cases is steel, in different alloys or with different surface treatments or coatings. The problem of steel is its high weight. This has motivated the development of structural variants in order to lighten cassettes while maintaining the resistance and hardness of the teeth of the sprocket.

In this document, tangential forces refer to the forces in the direction that is tangential to the diameter of the sprockets, axial forces refer to the forces in the direction of the cassette axis (and of the wheel axis), and radial forces refer to forces perpendicular to the previous two forces.

The simplest and most economic construction is the one described for example in US 20060258499 A1, which consists in individual steel sprockets with the grooved geometry of the freewheel body in its internal part and spacing rings (spacers) between sprockets for allowing the appropriate separation between them. The system is completed with a threaded lock-ring over the freewheel body which, by pressing, axially fixes the ensemble of sprockets and spacing rings against the freewheel body conforming a single unit. This unit behaves like a rigid solid during operation, called cassette ensemble, but it is easy to disassemble, for example to substitute only the sprockets due to the wear they are subject to during usage.

This configuration implies the spacing rings to be located in a more external radial position than the grooved geometry, therefore the transmission of tangential forces, which are the forces of highest magnitude, is done in a position farther from the teeth than the axial forces. Because of this, the sprockets must be stiff and resistant throughout their whole radial dimension and this makes them heavy. The spacers usually have a uniform section in the face perpendicular to the axis throughout the whole axial dimension in order to optimize their support and axial force transmission function. In this manner, the spacers must remain circumscribed inside the base diameter of the smallest sprocket being connected, so that no contact occurs between the spacer and the chain when the chain is engaged in such sprocket.

This implies that for the larger sprocket the distance between the teeth and the spacer to be larger, being the surface of tangential effort transmission even further away from the teeth where the force is applied, and this requires sprockets with more material.

In some solutions in the state of the art such as in U.S. Pat. No. 8,696,503, the size of the spacers increases according to the size of the sprockets in order to improve the axial force transmission between sprockets. However, the disposition of the grooved geometry for the transmission of tangential forces is in the same radial position for all the sprockets, which is specially far away from the teeth in the largest sprockets, therefore they are mainly these largest sprockets the ones that increase the weight of the cassette.

In some documents such as in U.S. Pat. No. 4,121,474, it is proposed the spacers to be an integral part of the sprockets, this is, the base of the sprocket to be wider than the area in which the chain is supported, so that when supporting the sprockets directly on the neighboring sprockets these become correctly spaced. The force transmission is the same as in the previous case where the maximum diameter for axial force transmission is larger than the maximum diameter for tangential force transmission in both associated sprockets, so no significant advantage is obtained in terms of weight.

In US 20150133249 A1, it can be observed one solution that allows reducing size and therefore weight of the largest sprockets by the utilization of an auxiliary grooved support that brings the surface for tangential force transmission closer to the teeth of the sprocket. However, this coming together of the tangential force transmission surface and the teeth, and thus the lightening of the sprockets, is still limited by the constant section spacers located below the base line of the smallest neighboring sprocket and above the grooved geometry for tangential force transmission of both neighboring sprockets.

In U.S. Pat. No. 6,428,437 B1 it is observed a configuration to approximate the grooved geometry or tangential force transmission surface to the teeth and thus reduce the size and weight of the sprockets. In order to do so the use of any spacer as well as any support or axial force transmission between neighboring sprockets is avoided, and each sprocket is directly fixed to the auxiliary support by deformation of such structure. Because of this, the sprockets cannot be disassembled from the supporting structure without damaging the structure, so in case of wear of any sprocket all sprockets as well as the auxiliary support must be substituted. Even eliminating the axial contact between sprockets, in U.S. Pat. No. 6,428,437 B1 the sprockets are axially supported in the support structure for their fixation and to transmit the axial forces on the sprocket at a distance always closer to the teeth than the transmission of tangential forces.

In US 2016/0229486 A1 it is proposed the use of sprockets with reduced annular or radial thickness made out of a hard material such as steel or titanium, embedded or glued to a supporting element made out of a lighter material such as aluminum or resin, which form a single body for each sprocket and can be fixed directly in the freewheel body, with the spacers integrated or not in the sprockets, or glued to the neighboring smaller sprocket.

Similar to U.S. Pat. No. 6,428,437 B1, publications EP0510371B1, EP1074462A2 present an auxiliary support to which sprockets of reduced radial thickness are irreversibly fixed, usually by means of rivets.

Usually these elements are called spiders due to their shape, and often several spiders are used to support all the sprockets as it is described for example in U.S. Pat. No. 6,102,821, EP1407962A1 and U.S. Pat. No. 7,344,463.

In these cases, both axial forces and tangential forces are transmitted from the sprocket to the support or spider by means of the joining element, and then the spider with its sprockets is mounted on a standard freewheel body by exerting an axial preload as described in US 20060258499 A1.

It is also usual to combine on a single freewheel body, sprockets supported by spiders with more traditional sprockets without any spider as in U.S. Pat. No. 6,102,821. Therefore, in any of these configurations the transmission of tangential forces from the consumable part, sprockets and spider or support in case they had them, to the non-consumable part, i.e. the freewheel body, is realized in a radial position closer to the axis than the transmission of axial forces, and far away from the teeth where the chain applies its force, which results either in heavy structures or complex and expensive structures.

The cassettes incorporating spiders can be cheaper if the sprocket fixation can be disassembled so that only sprockets can be substituted after wearing out and the spider can be maintained as in EP051037161, in other words, if the spider is not a consumable part anymore. It is possible to minimize the sprocket volume with other types of fixations between sprocket and spider such as those described in US20030199351 and EP 1619417A2 regarding a bicycle transmission or GB2039662A, U.S. Pat. Nos. 3,168,836 and 5,669,423 regarding gears.

In US 20100099530A1 a cassette is described with some sprockets joined by means of rivets to a spider, some other sprockets directly mounted on the freewheel body, and some intermediate sprockets that are linked among them by means of a grooved geometry and are fixed by axial pressure of neighboring sprockets generated by an external threaded lock ring. In this configuration, it is possible to obtain intermediate sprockets of reduced radial thickness where the surface for tangential force transmission to the larger neighboring sprocket is above the surface for preload induced axial force transmission to the smaller neighboring sprocket.

However, this is a complex sprocket with two different grooved geometries for fixation, for the larger sprocket and for the smaller sprocket, which in general will be costly to manufacture. In fact, in one of the configurations described in US 20100099530A1 all the intermediate sprockets form a single part which is easier to manufacture.

It is also possible to manufacture all the sprockets as a single part and out of the same material by means of extensive use of machining process as in EP 1972540 A2, U.S. Pat. No. 8,663,044, US20100075791, US20130017914 or US20130225343.

This machining process allows obtaining sprockets of minimum annular or radial thickness and connect the different sprockets with nerves. In some of these designs the sprockets are manufactured out of a single block as in EP 1 972 540 A2 and U.S. Pat. No. 8,663,044, and an additional part is proposed which is supported between the block of sprockets and freewheel body in order to provide more stiffness and resistance to the single-part block of sprockets. This additional part will be firmly joined to the block of sprockets so, as far as functioning goes, it is considered as an additional consumable part of the cassette ensemble.

The cassettes manufactured as a single part, either cassettes formed by different parts that are irreversibly assembled or either cassettes manufactured out of a single material block as a single part, are very light solutions but they are also costly. As the cassette is a consumable that must be substituted several times over the lifetime of a bicycle, it would be beneficial to have more affordable cassettes.

In any of these designs each sprocket is individually joined to the spider in such a way that the axial forces and the tangential forces are transmitted through the same surface, so the maximum diameter for axial force transmission is not smaller than the maximum diameter of tangential force transmission between the consumable element and the non-consumable element, considering the spider as a non-consumable part.

Finally, in EP1342657A2 it is presented a sprocket with two grooved geometries similar in some configurations to an intermediate sprocket in US 20100099530A1 but comprising a different function; in this case it is not about lightening the sprockets by providing direct support to larger sprockets, but to create a joining surface for smaller sprockets of reduced size that do not fit in the grooved geometry of the freewheel body.

DESCRIPTION OF THE INVENTION

In order to avoid the limitations in the state of the art, the present invention proposes a cassette for a bicycle transmission system, comprising:
- at least a first sprocket provided with a plurality of teeth and a second sprocket provided with a smaller number of teeth than the first sprocket and mounted on an axis common to the first sprocket, in both sprockets a base line of the teeth being defined; and
- a supporting structure for the sprockets,
- an outer edge configured by the teeth and an inner edge oriented towards the axis being defined in the sprockets, the inner edges of the sprockets being formed by grooved surfaces, the supporting structure being provided with two engagement surfaces complementary of the grooved surfaces of the grooved sprockets, such that tangential forces between the sprockets and the supporting structure can be transmitted, the cassette comprising at least a spacer between sprockets, wherein the diameter of the base line of the second sprocket is smaller than the average diameter of the grooved surface of the first sprocket, the spacer having a part closer to the axis and a part farther from the axis, the spacer extending between the first sprocket and the second sprocket at least from the grooved surface of the first sprocket to at least the base line of the second sprocket, such that the part closer to the axis of the spacer acts as an abutting spacer with the second sprocket, while the part farther from the axis of the spacer allows to exert axial forces on the first sprocket.

With these characteristics, it is possible to have sprockets of minimum radial thickness, that are simple and easier to manufacture with a single grooved geometry per sprocket where each sprocket transmits the tangential forces directly to the supporting structure, contrary to what is shown in US 20100099530A1 and EP1342657A2.

By means of the proposed structure, the axial forces are transmitted from sprocket to sprocket by the spacers, so that the assembly can be done by applying an axial preload with a cover, which allows disassembling the sprockets when wear occurs without damaging the supporting structure, in contrast to solutions such as the one described in U.S. Pat. No. 6,428,437 B1.

The spacer extends from below the average diameter of the grooved geometry to at least the base diameter of the smallest neighbouring sprocket, in contrast to solutions such as the one shown in US 2015133249 A1, which allows reducing the radial thickness to the bare minimum to transmit the forces applied by the chain in all working conditions.

Depending on the axial position of the sprocket with respect to the chainring, the chain force can be applied with a certain angle, which implies the necessity of transmitting axial loads from the sprocket to the support structure. On the other hand, during the sprocket shifting process, the rear derailleur also exerts axial loads when pushing the chain against the sprockets. These axial loads, as well as any other axial force on the sprockets will be transmitted by the spacers, eventually in cooperation with the friction forces generated in the grooved surfaces.

This configuration of the sprockets requires a common support structure with specific grooves for tangential support of each sprocket, wherein the average diameter of each groove is close to the base of the teeth of the corresponding sprocket, and it is larger than the base diameter of the teeth of the smaller sprocket located immediately next towards the exterior of the cassette. This support structure is more complex than most of known support structures and it can be significantly lightened as it will be shown next.

One of the main advantages of the present invention is that the whole cassette ensemble is lighter and cheaper to manufacture due to the simplicity of the sprockets. This advantage is even greater when substituting the cassette due to wear, wherein it is possible to keep the more valuable supporting structure that does not suffer any wear during use, and substitute only the low-cost sprockets. This is a more economic and ecologic solution, due to the reduction of the materials used during substitution as well as their manufacturing, packaging and transport.

In a preferential configuration of the invention each one of the grooved surfaces engaging with a sprocket will have as many grooves as the number of teeth of the corresponding sprocket.

In this manner, a more homogeneous load transmission can be obtained between teeth and grooves reducing tension concentration, and if the peaks and valleys of the grooved surface are made coincident with those of the teeth, the radial thickness of the sprockets can be reduced to the minimum. In this preferential configuration, only sprockets of a given number of teeth will be possible to mount on each support structure, and in case of willing to change one of the sprockets for a larger or smaller size one so that the cassette's transmission ratio is changed, it will be necessary to change the support structure also.

In the present description, grooved surface refers to any surface inscribed between two cylindrical and concentric surfaces to the axis and that can transmit a torque respect to the axis even in the absence of friction. As an example, an oval shaped section is considered a grooved surface with a single groove as far as this invention goes.

It is also specified that when talking about complementary surfaces, it is not strictly necessary to be complementary in the whole periphery or inner edge and to have contact in the whole grooved surface, but it is enough with a partial contact between the surfaces to transmit the torque for moving forward.

It is also highlighted that tolerances can be applied to the complementary surfaces, at least partially, for the fabrication or the assembly, that only assure contact in the surfaces that transmit the forces.

In the following lines, diverse optional characteristics of the invention are presented which can be combined among them whenever this is technically possible and advantageous. It is also highlighted that some of the aspects described next can be advantageous in other contexts, thus they can be considered inventions for themselves and this will be pointed where appropriate.

The spacer(s) are joined to the first sprocket and consist in legs joined to the first sprocket by the inner edge thereof, the supporting structure being provided with a housing for the legs.

According to this particular solution, the spacer is an integral part of the first sprocket, so the number of parts to be manufactured is reduced without significantly increasing the fabrication cost of the sprockets, thus the total cost is reduced. As an example, it is possible to obtain single part sprockets economically by stamping so that the sprocket and the spacer have a continuity in shape with similar thickness, adding a fold, inclination or curvature to the part closer to the axis of the spacer in order to get the pursued separation respect to the second sprocket. With this configuration, it is assured that the spacer corresponding to the first sprocket is out of reach of the chain when the chain is engaged in the second sprocket.

In this configuration, the link of the spacer with the first sprocket by the inner edge of the first sprocket reduces the available grooved surface for the transmission of chain forces. Because of this the spacer will consist only of some legs that extend from certain location in the inner edge, maintaining the grooved surface in the rest of the inner edge of the sprocket for the transmission of the tangential forces.

The disposition of these legs in the same plane of the sprockets greatly implies the need of implementing a housing for each leg in the supporting structure. Optionally this housing can be designed in such a manner that maintains tangential contact with the legs, such that this contacting surface can contribute to the transmission of the sprocket tangential forces to the supporting structure.

The difference between a leg and a groove is that the groove always provides tangential support between the sprocket and the supporting structure but never provides axial support, while the leg always provides axial support and can also provide tangential support in some configurations. By differentiating a leg from a groove, the geometry of the legs will not be considered when calculating the average diameter of the grooved surface.

According to one alternative, the end of each groove in the first sprocket closer to the axis is prolonged to at least the base line of the second sprocket, abutting such end in the second sprocket, such that it acts as an abutting spacer with the second sprocket.

In this manner, each surface of contact of the sprocket for tangential force transmission corresponds with one leg, this is, no groove would exist according to the abovementioned definition. However, for this particular case wherein there are no axially unsupported grooves, the legs are considered as grooves (with axial support) and their profile is considered for the calculation of the average grooved surface diameter.

According to one alternative to the legs, the spacer(s) consist in a crown provided with radial legs, forming the crown the part closer to the axis, and forming the ends of the radial legs the part farther from the axis.

With these characteristics, when the spacer is a separated part, it can be made of a specific material to carry out its function, this is, it is not necessary for it to be made out of the same material as the sprocket. Moreover, it allows simplifying the fabrication of the sprocket because the parts are more compact and have a simpler shape.

According to an advantageous characteristic in the context of a spacer implemented as a crown, the first sprocket is provided with housings for housing the farther part of the radial legs.

In this manner, the legs allow exerting the axial force on the first sprocket or larger sprocket taking the minimum space between sprockets and therefore bearing space for the chain.

These housings in the first sprocket for placing the spacers reduce the surface of contact between the grooved surface of the sprocket and the grooved surface of the supporting structure, limiting the capability of force transmission.

In order to have a larger surface for the force transmission, the housings of the first sprocket are limited to only part of the circumference, such that the radial part of the spacer becomes one or several legs. It is preferable to have several legs to transmit the axial forces between sprockets in the most balanced manner. The main function of these legs is the transmission of the assembly-induced axial forces between the sprockets; the axial forces generated during operation will be largely sustained by the friction in the grooved surfaces as they will be always accompanied by larger tangential forces.

According to an advantageous characteristic applicable to either a configuration based in legs or a configuration based in a crown, the spacers comprise a bearing surface for bearing the chain in the shifting process from the second sprocket to the first sprocket.

These support surfaces for the chain are up-shifting points during the chain shifting process from the second sprocket to the first sprocket. For the maximum precision and smoothness during shifting, the disposition of these support surfaces will be similar to the recesses or lowerings in the sprockets to ease shifting already known in the state of the art. In this manner, a preferential position configuration of these support surfaces will define the position of the legs, and the number of legs of the first sprocket will correspond preferably with the teeth difference respect to the second sprocket.

Obviously, it will be assured that the rest of geometric characteristics oriented to ease the shifting process will be conveniently distributed with respect to the legs.

The support will have a recess in the area of the legs in order to avoid contact with the chain during the shifting process form the second sprocket to the first sprocket, and so that all wear occurs in the sprocket which is a consumable element.

Preferably, the area of the spacer located in the closest end to the axis angularly coincides with the closest part of the axis to the grooved surface of the second sprocket.

By making the leg support coincide in a valley of the second sprocket where the radial thickness of the sprocket respect to the base line is maximum, it is possible to increase the area of axial force transmission. In other words, when taking the axial abutment with the leg to a valley, it is possible to optimally reduce the radial thickness of the sprocket maximizing the lightening and cost reduction advantages of this invention.

In a preferential configuration, wherein the upper part of the legs is set according to support points for the chain during shifting, the lower part of the legs will coincide with the valley that is closest to the grooved surface of the second sprocket in the advancing direction of the sprocket (from the leg towards the chain support). In the cases where the lower part of the leg is very far from the upper part where the chain support is located, it is possible to lighten the part of the leg that communicates with a hole or by making it slenderer.

Advantageously, the second sprocket has protrusions which prolong the grooved surface in the direction of the first sprocket.

In this manner, the function of the spacer is split between the legs of the neighbouring sprocket and its own protrusions, which allows increasing the grooved surface in contact between sprocket and supporting structure, and therefore better distributing the tangential efforts. In one possible configuration, the protrusions can extend up to the plane of the first sprocket such that the legs remain completely in the plane of the sprocket. In another configuration, the protrusions can be substituted by a circular or grooved ring, so that the sprockets can be fully flat and thus easier to manufacture.

The invention can be applied to a cassette with two sprockets, but obviously its preferential application will be in a cassette with more than two sprockets.

Each of the sprockets is configured as a first sprocket in its outermost side and as a second sprocket in its innermost side. Obviously, this is true except for the first sprocket whose innermost side is configured for axially supporting it in the supporting structure, and the last sprocket whose outermost side is configured to support it against the locking element.

The ensemble will be advantageously completed with a cover for locking and pressing.

According to one cassette configuration of the invention, the supporting structure extends as a freewheel body of the wheel and comprises an axial abutment in its innermost part for the first sprocket, and joining means in its outermost part for fixing a closing cover on the last sprocket.

In this configuration, the supporting structure acts as freewheel body of the wheel. The freewheel body of the wheel is usually joined to the wheel by means of freewheel mechanisms that transmit rotation in the advance direction from the freewheel body to the wheel, but allow free rotation in the opposite direction.

In this configuration, when mounting sprockets on the freewheel body or supporting structure, these remain tangentially or radially fixed by the grooves themselves. For the axial fixation, a cover is used which is preloaded and fixed respect to the freewheel body or supporting structure, preferably by means of a threaded link that presses the last sprocket against the previous one, while the latter presses against the previous larger sprocket, with or without a spacer in between, until pressing the first sprocket against the axial abutment of the freewheel body or supporting structure, so that all sprockets are fixed to the freewheel body and operate as if they were a single solid element.

The freewheel body or supporting structure can be manufactured in several parts and firmly joined afterwards to facilitate its fabrication.

According to one alternative configuration, the supporting structure has engagement grooves oriented towards the axis complementary to grooves of the freewheel body of the wheel, and contacts with an axial abutment ledge of the freewheel body in the part farther from the cover. This configuration comprises also an axial abutment in the supporting structure for the first sprocket, as well as a last sprocket that is mounted in the supporting structure from which a first additional sprocket abuts, which is directly mounted on the grooves of the freewheel body of the wheel.

In this variant, the supporting structure is mounted in a freewheel body as if it was an ensemble of sprockets similar to the ones known in the state of the art, which is axially supported against the bearing surface of the freewheel body. According to this invention, additional sprockets (similar to the ones known in the state of the art) are directly mounted on the freewheel body, fixing the whole system by means of a closing cover screwed to the freewheel body.

For the right spacing between the last sprocket and the first additional sprocket, an intermediate spacer is used which could be either an independent element or be integrated in any of the two sprockets. The cover presses against the last of the additional sprockets, this presses against the next larger additional sprocket, with or without a spacer in between, until the first of the additional sprockets presses against the last of the sprockets without contacting the supporting structure, then the pressure on the last sprocket is transmitted to the previous sprockets larger in size, until the first sprocket transmits the axial pressure to the supporting structure which will transmit it to the freewheel body, forming a preloaded ensemble, which works as if it was a single rigid solid. The supporting structure can be manufactured in several parts that can be firmly joined afterwards in order to facilitate its fabrication.

In this configuration, the invention has the advantage of being compatible with wheels already existing in the market, and still has advantages respect to what is known in terms of lightness and cost, as in this configuration it is possible to only substitute the sprockets due to wear, maintaining the original supporting structure.

According to an especially advantageous characteristic of the invention, the material of the sprockets has a hardness greater than the material of the supporting structure.

In order to avoid early wear of the sprockets in contact with the chain, the sprockets must be made out of a hard material such as steel or titanium, and/or have superficial treatment or coating to harden the surface of contact. In the other hand, the supporting structure must be manufactured with softer materials but with good resistance/weight and stiffness/weight ratios in order to lighten the ensemble, such as aluminum, magnesium, carbon fiber or other kinds of synthetic composites. In general, these softer materials are easier to be manufactured as compared to steel or titanium. In this manner, by separating the parts that engage with the chain from the structural part, it is possible to apply to each part the optimum material for its function and optimize the cassette ensemble in terms of weight, cost, resistance or duration.

The invention also refers to a sprocket for a cassette according to any of the variants of the invention.

The invention also refers to a sprocket for a cassette, being defined in the sprocket an outer edge configured by the teeth and an inner edge, being the inner edge configured by a surface oriented to its insertion in a supporting structure provided with an engagement surface complementary to the surface, being defined in the sprocket an axis, and which comprises at least one spacer leg oriented to separating from a second sprocket, having the spacer leg a part closer to the axis and a part farther from the axis, extending the spacer leg at least from the surface towards the axis, such that a part closer to the axis of the spacer leg can operate as spacer with a second sprocket whose base line has a diameter smaller than the average diameter of the surface of the sprocket.

Preferentially in this sprocket, the spacer leg(s) comprise(s) a bearing surface for bearing the chain in the chain shifting processes from the second sprocket to the first sprocket.

Advantageously, in this sprocket the surface in the inner edge is grooved, such that it can transmit tangential forces between the sprocket and the supporting structure.

The invention also refers to a cassette for a bicycle transmission system, which comprises at least a sprocket and a supporting structure for the sprocket, being defined in the sprocket an outer edge configured by its teeth and an inner edge oriented towards the axis, being the inner edge of the sprocket configured by a grooved surface, being the supporting structure provided with an engagement surface complementary to the grooved surface of the sprocket, such that it can transmit tangential forces between the sprocket and the supporting structure, comprising the sprocket an axial abutment over the supporting structure, wherein the axial abutment over the supporting structure is located between the complementary bearing surface and the axis.

The disposition of the spacer extends below the grooved surface of the first sprocket so that the axial abutment of the second sprocket can support this first sprocket in the axial abutment of the supporting structure below its grooved surface, contrary to the solutions in the state of the art such as for example US 20060258499 A1 and US 20150133249

A1. The absence of a spacer in the grooved surface facilitates its fabrication and also makes the supporting structure to be more compact, so that this solution can be lighter and cheaper.

BRIEF DESCRIPTION OF DRAWINGS

In order to complement the description and to help understanding the characteristics of the invention, in accordance with several examples of its practical realization, a set of figures is provided as integral part of the description wherein illustratively and without limiting purpose, the following has been represented:

FIGS. 9, 10 and 11 are three views of a sprocket according to the invention, in which the great reduction in radial thickness that can be achieved with the invention is shown.

DESCRIPTION OF PREFERRED REALIZATIONS OF THE INVENTION

As shown in the figures, the invention refers to a cassette 1 for a bicycle transmission system, which comprises a first sprocket P1 provided with a plurality of teeth T1 and a second sprocket P2 provided with a smaller number of teeth T2 than the first sprocket P1, i.e. the first sprocket is larger than the second sprocket.

Figure 1:
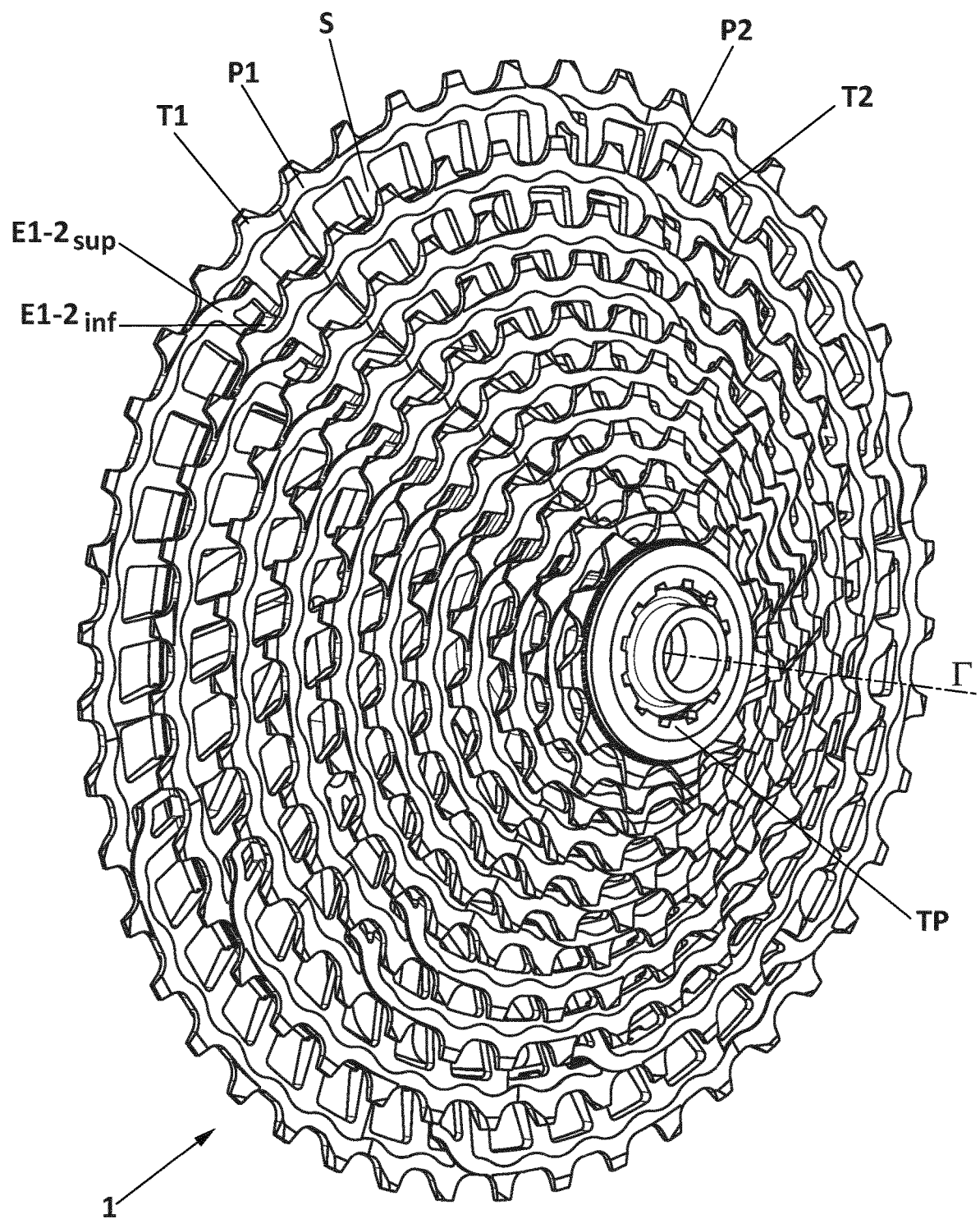
FIG. 1 is a view in perspective of the cassette according to the invention, which shows the legs, bearing grooves and the relation of diameters that allow reducing to the maximum the radial thickness of the sprockets.

The invention can be explained with two sprockets, but obviously it can be applied to more sprockets, i.e. to a whole cassette, for example with eleven sprockets as shown in FIG. 1.

The sprockets are mounted in such a way that they share the axis $\Gamma$.

As it is known, in the sprockets or in the teethed wheels oriented to engage with a chain, a base line is defined, which is a curve, in general a circle, that goes through the bottom of the valleys.

Figure 2:
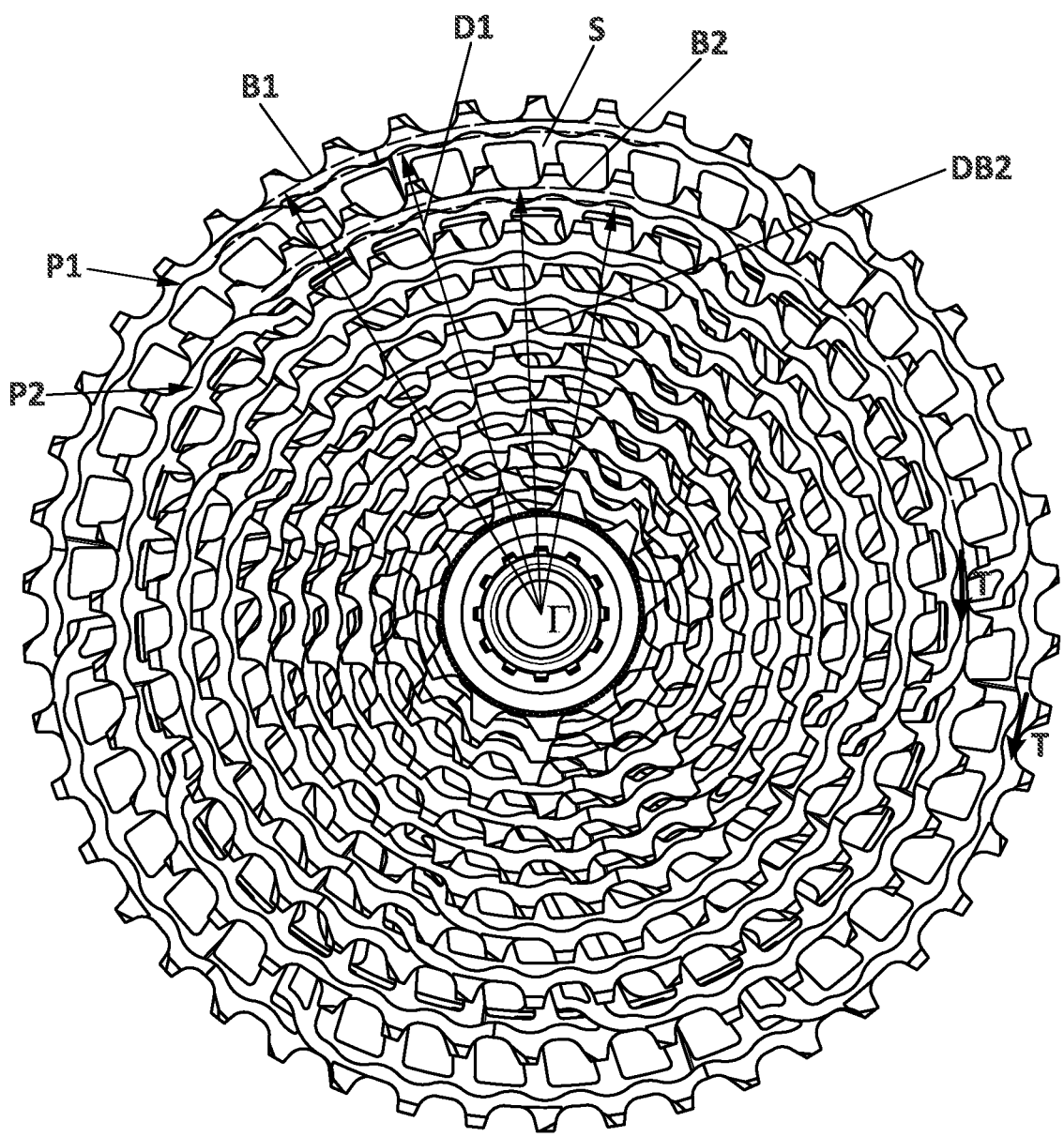
FIG. 2 is a view in the axial direction that shows the different relations between diameters.

Therefore, in the sprockets P1, P2 base lines B1, B2 are defined, which are shown as intermittent lines in FIG. 2.

The cassette is completed with a structure S for supporting the sprockets P1, P2. It is a supporting structure common to all sprockets in the sense that each one of them is supported by the structure S. In other words, contrary to other cassettes, the sprockets are not consecutively supported ones on top of others.

To define the invention, it is necessary to define in the sprockets P1, P2 an outer edge CE1, CE2 configured by the teeth T1, T2 and an inner edge CI1, CI2 oriented towards the axis $\Gamma$. As it is known and as it is shown in the figures, especially in FIG. 6 or 16, the inner edges CI1, CI2 of the sprockets P1, P2 are configured by grooved surfaces P11, P21.

Figure 5:
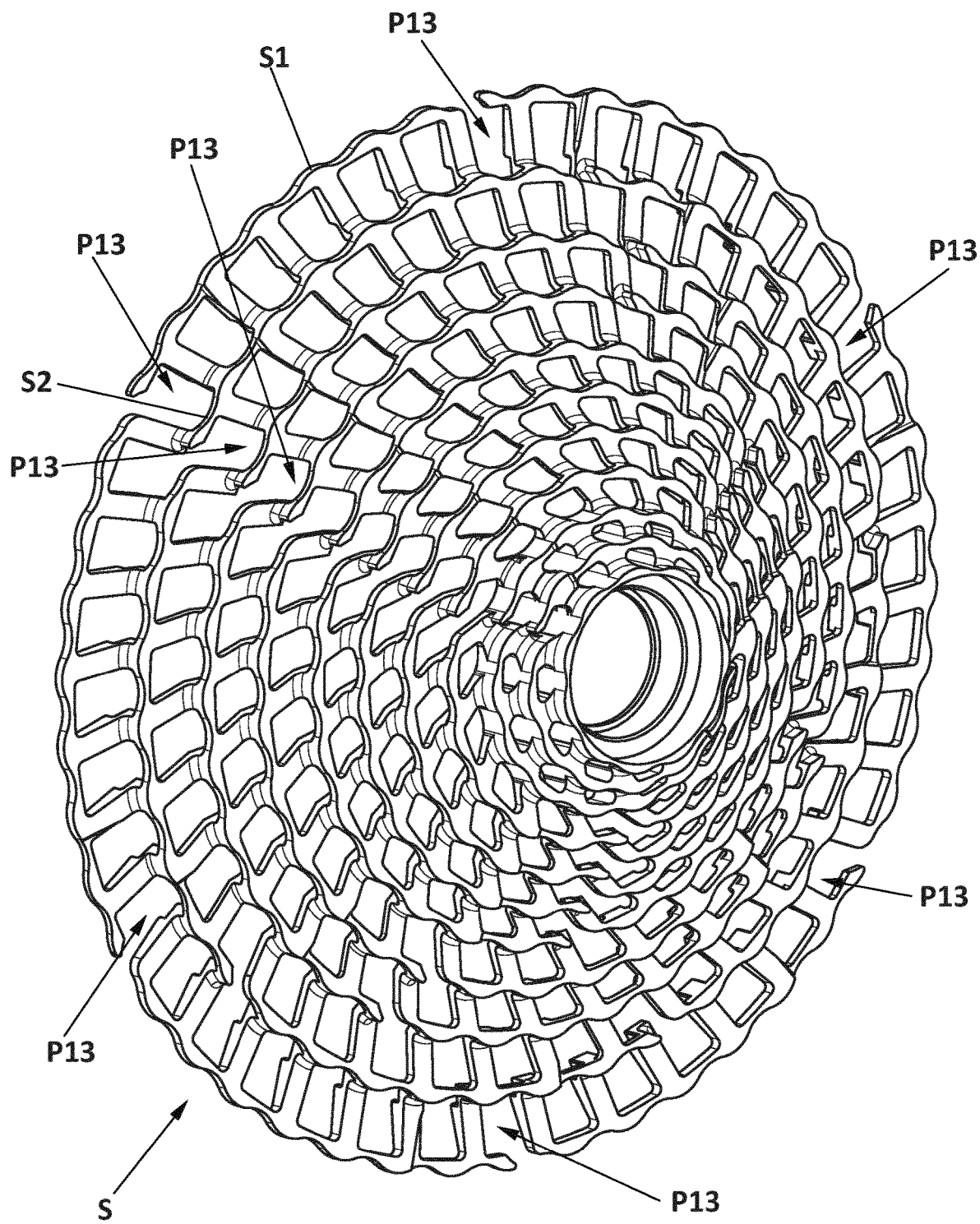
FIG. 5 shows a supporting structure according to the invention, conveniently lightened.
Figure 16:
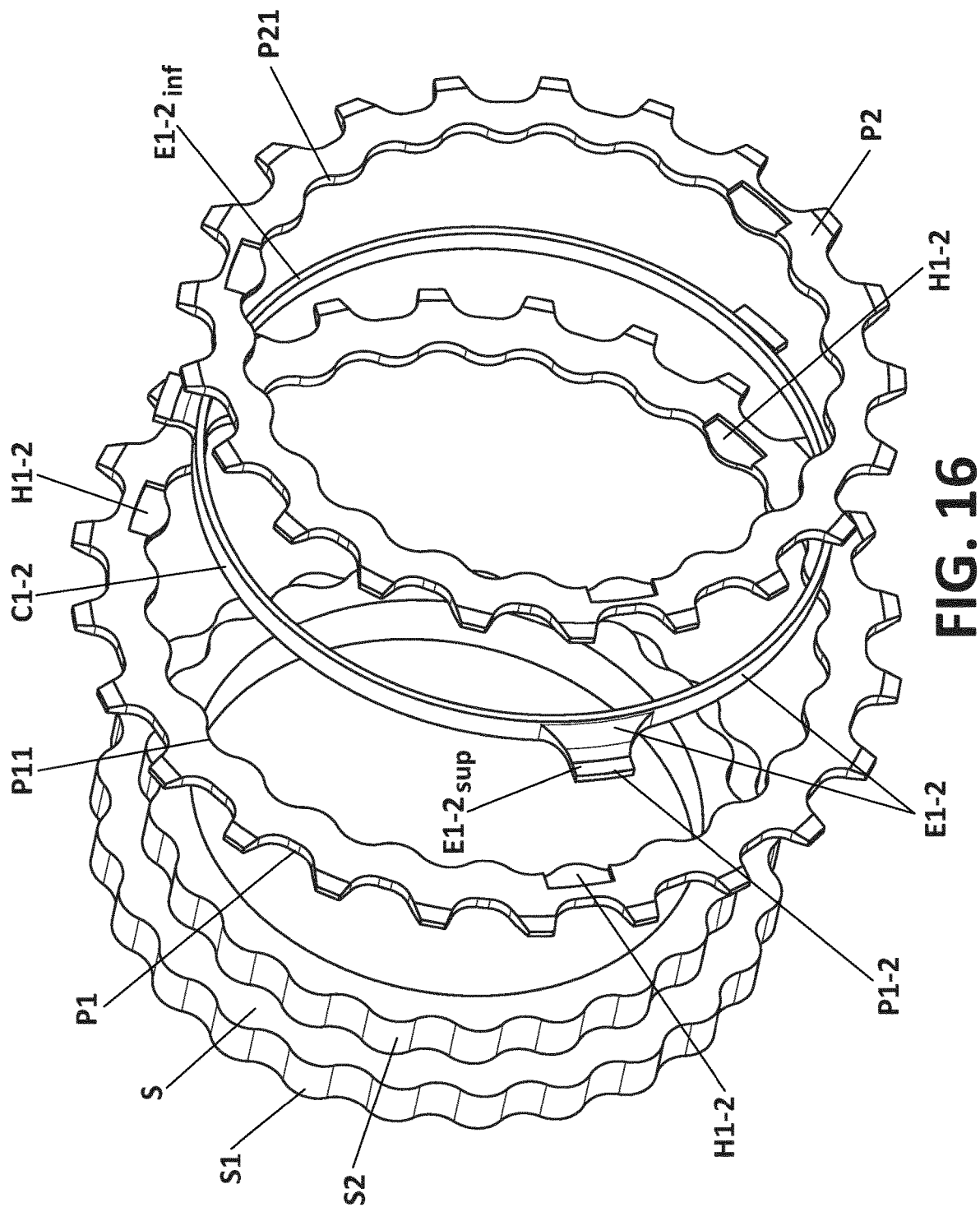
FIG. 16 is a disassembled perspective of one realization based in crowns as spacers.

Also, as shown in FIG. 5 or 16, the supporting structure S is provided with engagement surfaces S1, S2 complementary of the grooved surfaces P11, P21 of the grooved sprockets P1, P2 respectively.

Figure 12:
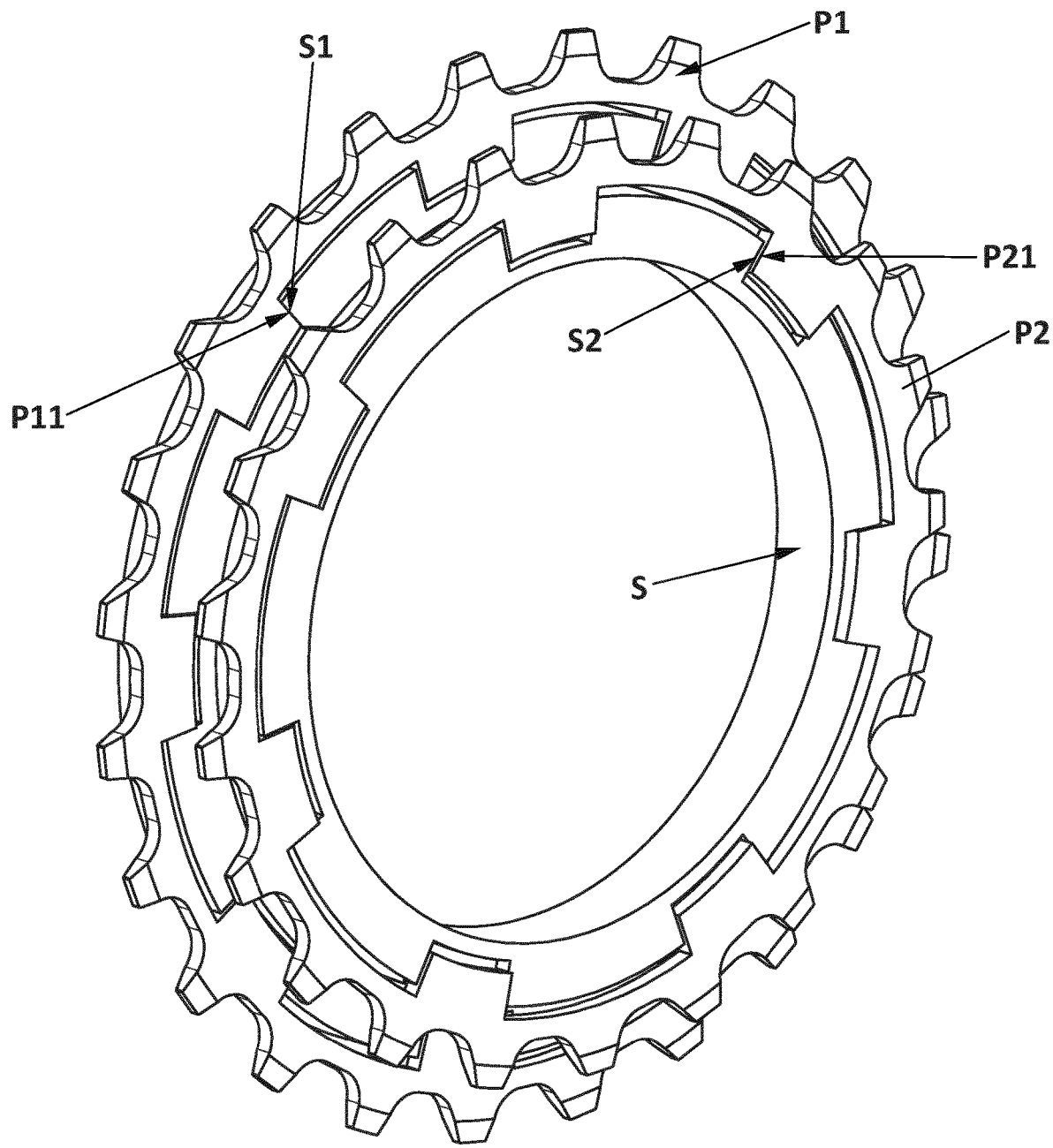
FIG. 12 shows two sprockets in which the grooving of the sprockets and of the supporting structure are not fully complementary, but wherein there is enough tangential support for the transmission of advancing forces. For better clarity, in this figure it is not represented the spacer E1-2 that provides the axial force transmission between them.
Figure 14:
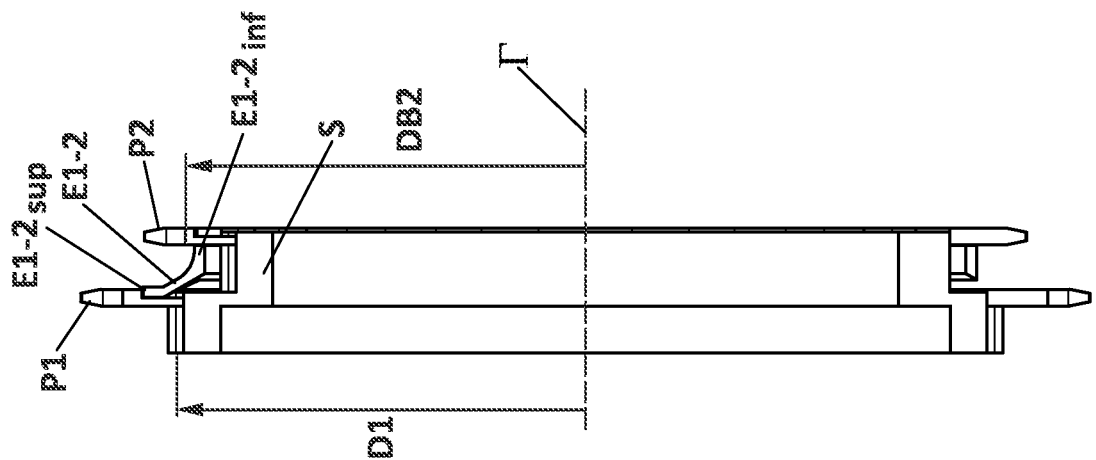
FIGS. 13, 14 and 15 show several views of a cassette ensemble with two sprockets, but wherein the spacers are formed by crowns provided with radial legs.
Figure 13:
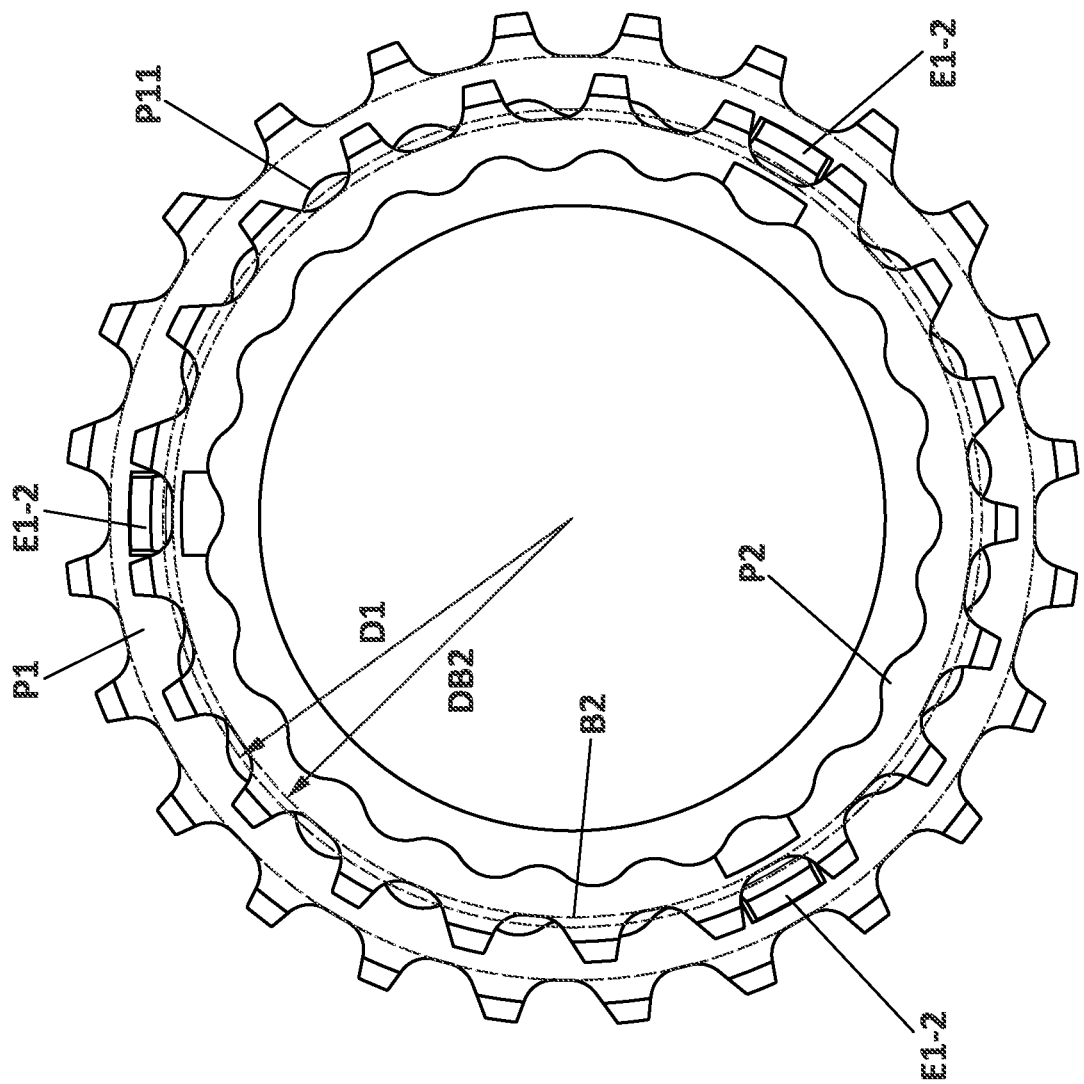
Figure 15:
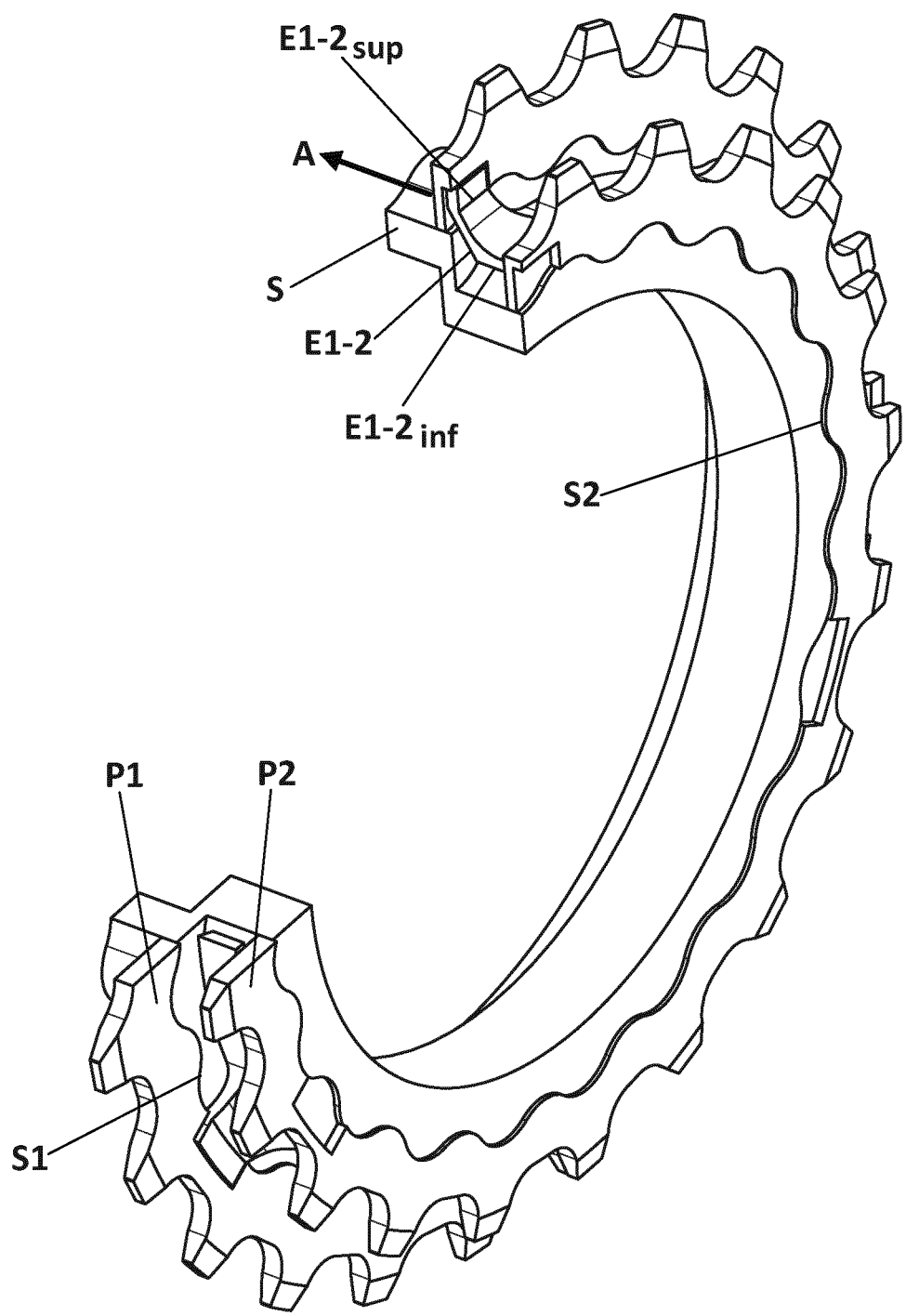

As shown in FIG. 12, surfaces S1, S2 are not necessarily strictly complementary to the grooved surfaces P11 and P21 according to the geometric definition of complementary surfaces; according to the invention proposed it is sufficient to have tangential contact between both surfaces for the appropriate transmission of the tangential forces. It is not even strictly necessary that the tangential interference between the sprocket and the supporting structure to completely restrict both parts in tangential direction; a tangential clearance similar to the one that currently exists between the sprockets and grooved surface of the freewheel body can be considered, so that the transmission of tangential forces in a single direction determines the relative position between the two parts, while they are fixed by the axial pressure of the cover for low loads.

Figure 4:
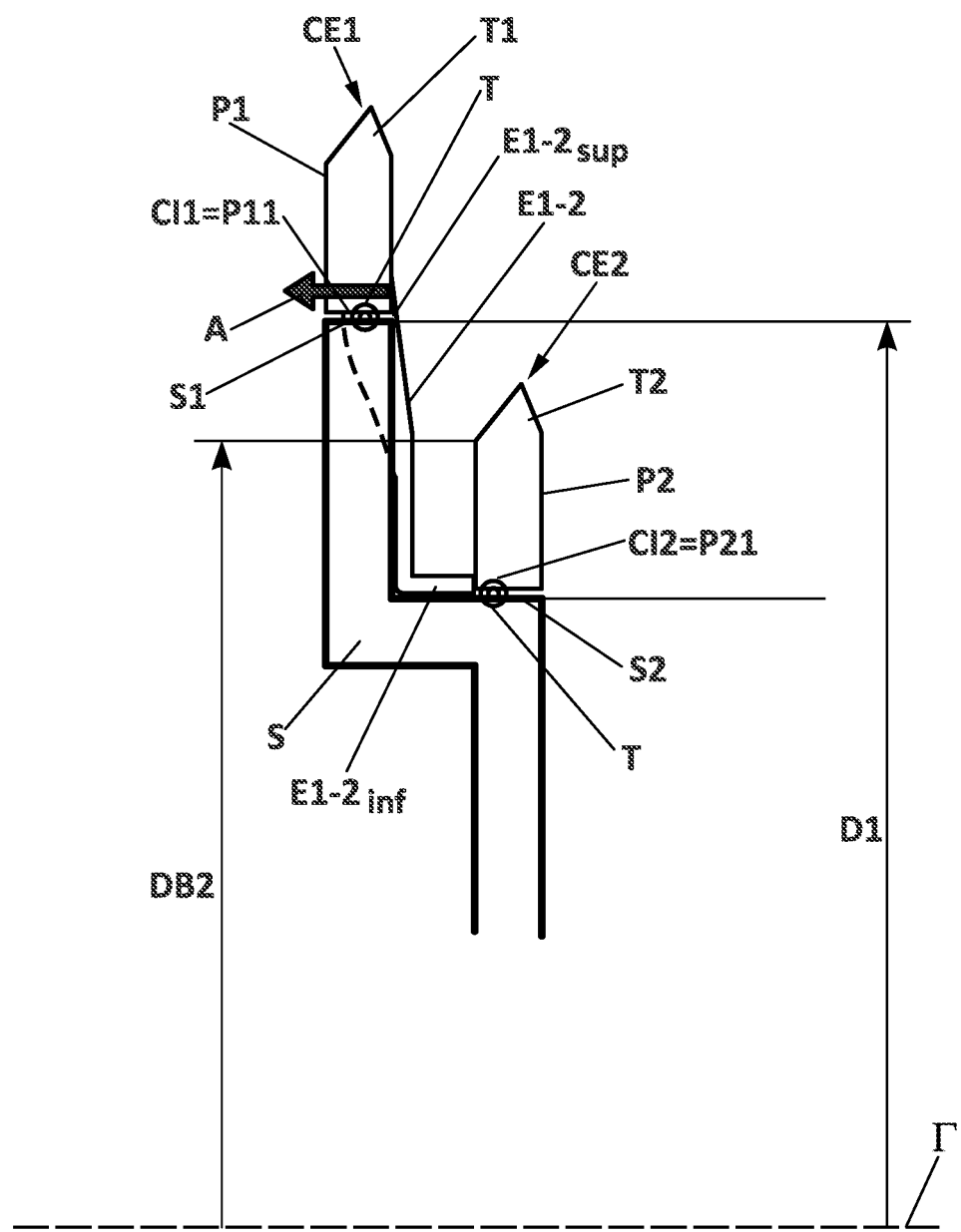
FIG. 4 is a view analogous to FIG. 3 but more schematic, which shows the most relevant aspects of the invention.

By providing these grooved surfaces, tangential forces T between the sprockets and the supporting structure S can be transmitted, as shown in FIGS. 2 and 4.

Figure 8:
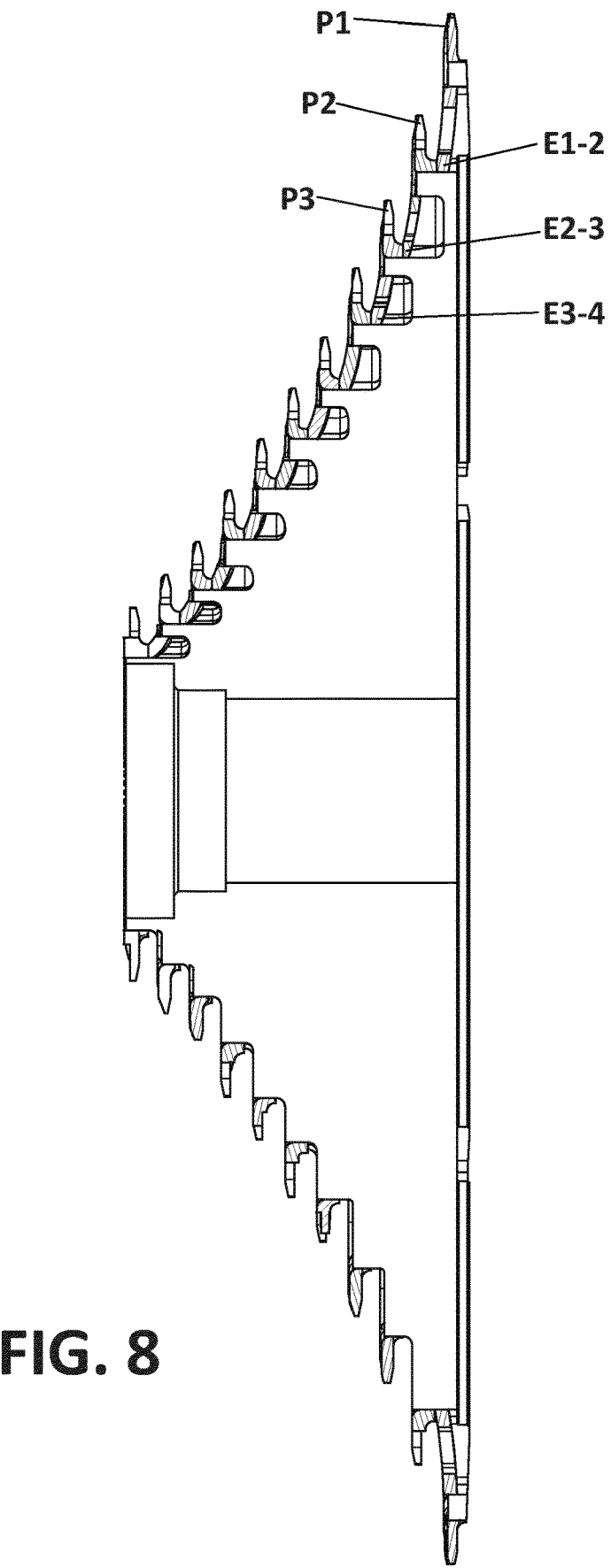
FIG. 8 is analogous to FIG. 3, but showing the whole cassette in this case.
Figure 17:
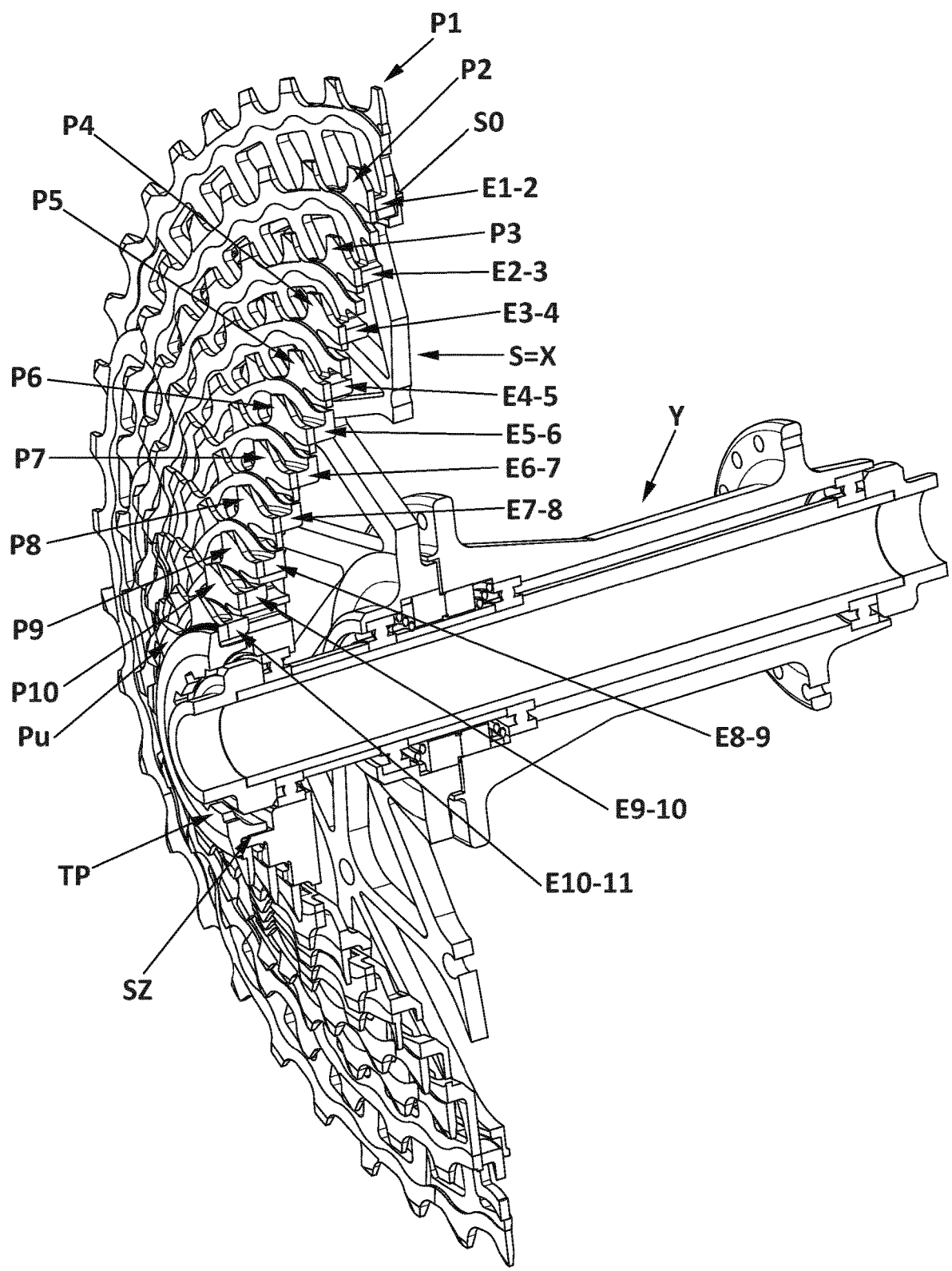
FIG. 17 shows a perspective with an axial cross-section of a cassette in configuration of freewheel body.

In order to assure the correct positioning between sprockets, the cassette comprises spacers E1-2, E2-3, E3-4 . . . between sprockets as shown for example in FIGS. 8 and 17, indicating as E1-2 the spacer between sprockets 1 and 2, as E2-3 the spacer between sprockets 2 and 3, and successively until reaching the last sprocket.

According to one aspect of the invention, and as shown for example in FIG. 2 or in FIG. 4, the diameter DB2 of the base line B2 of the second sprocket P2 is smaller than the average diameter D1 of the grooved surface P11 of the first sprocket P1, being this a particular novelty of the present invention.

Figure 7:
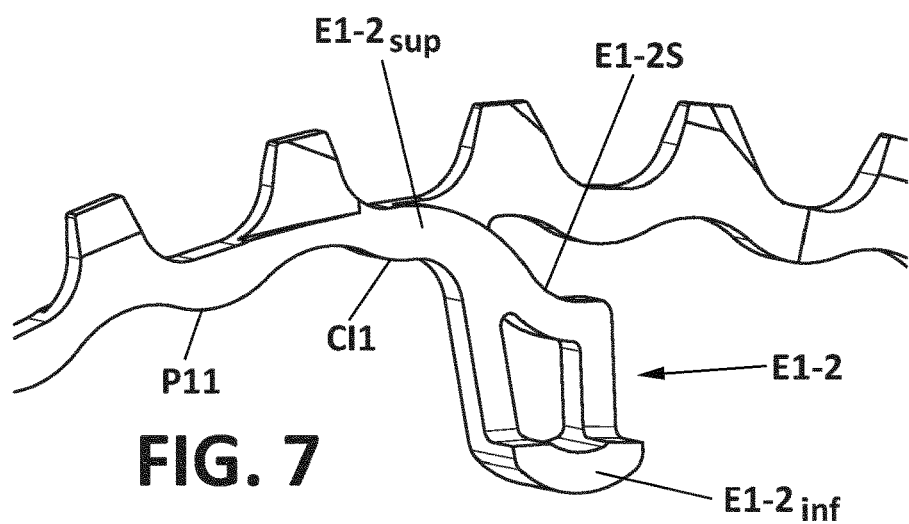
FIG. 7 shows in detail a lightened leg provided with a surface to ease upshifting of the chain during the chain shifting process.

Also, as shown in FIGS. 4 and 7, each of the spacers has a part $E1\text{-}2_{inf}$ closer to the axis $\Gamma$ and a part $E1\text{-}2_{sup}$ farther from the axis $\Gamma$. This is, in all realizations, the spacers necessarily have a radial component that places their ends at different distances from axis $\Gamma$.

In particular, when referring for example to the first and second sprockets P1 and P2, the spacers E1-2 between the first sprocket P1 and the second sprocket P2 extend at least from the grooved surface P11 of the first sprocket P1 to at least the base line B2 of the second sprocket P2, such that the part E1-2$_{inf}$ closer to the axis Γ of the spacer E1-2 acts as an abutting spacer with the second sprocket P2, while the part E1-2$_{sup}$ farther from the axis Γ of the spacer E1-2 allows to exert axial forces A on the first sprocket P1. As it is shown for example in FIG. 6, the first sprocket has six spacers.

Figure 3:
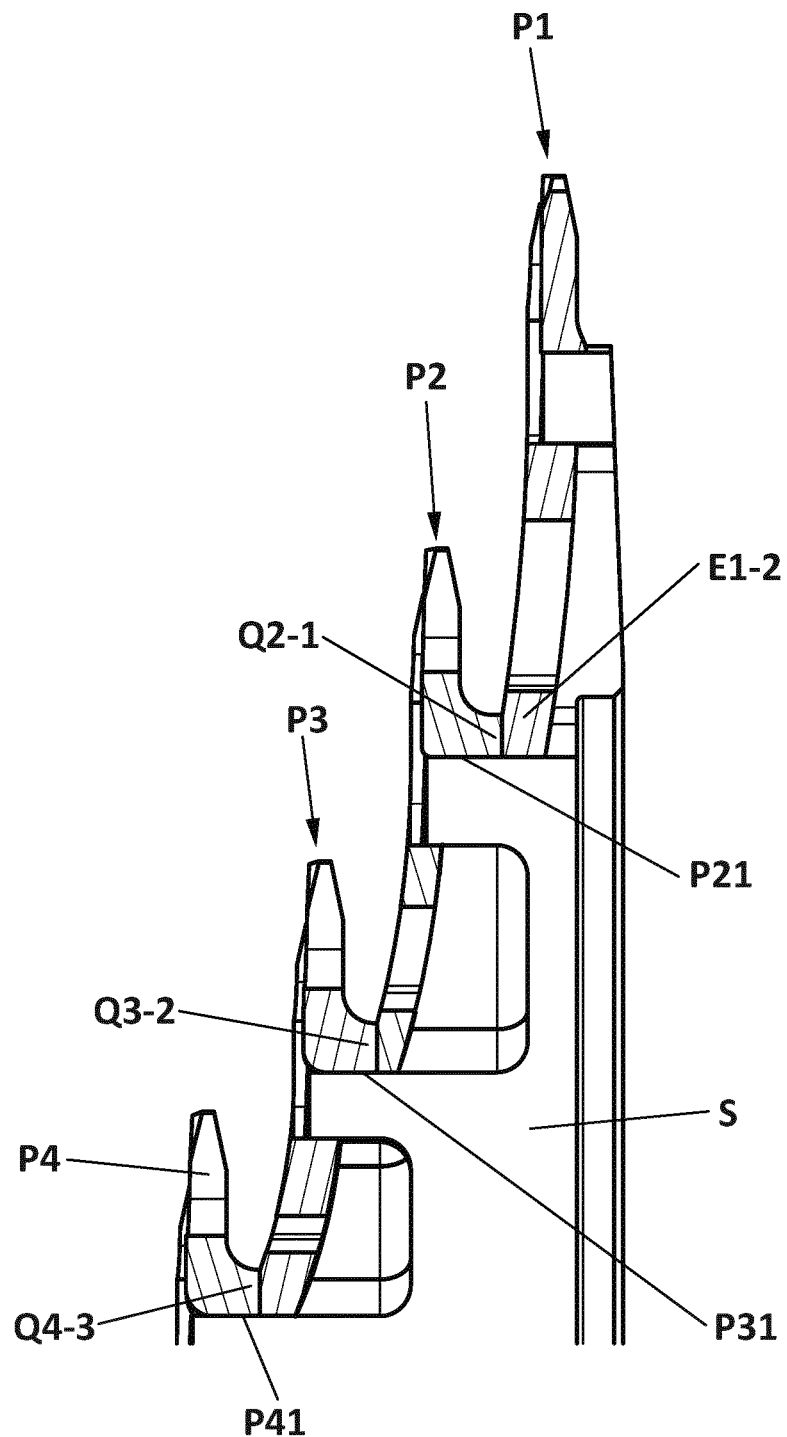
FIG. 3 is a detailed view that shows the axial abutment between sprockets.

In FIG. 4 these characteristics are shown very schematically with the purpose of making this inventive concept clear. FIG. 3 shows the components in a drawing corresponding to an operative design.

Once having explained the inventive concept that is common to the realizations of the invention, the main two variants of the invention will be described, one based in spacing legs, illustrated among others in FIGS. 1 to 11, and the other based in a crown spacer, illustrated in FIGS. 13 to 16.

Therefore, according to the first variant of the invention, as clearly shown in FIG. 7, the spacers E1-2 are attached to the first sprocket P1 and consist in some legs joined to the first sprocket P1 by its inner edge CI1.

Obviously, all sprockets will have their corresponding legs, which will separate them form the smaller neighbouring sprocket by means of an axial abutment as shown in FIGS. 7 and 17, or by means of an inclination of the legs as shown in FIGS. 8 and 10.

As shown in FIG. 5, the supporting structure S is provided with a housing P14 for the legs E1-2. In this manner, the legs do not surpass axially the sprocket in the area where the chain could be placed, but depart in centripetal radial direction, preferably with a tangential component as it will be shown later, to be curved in its end so that it is directed towards the neighbouring sprocket.

In these realizations, the main part of the tangential force transmission between sprocket and supporting structure is done by means of the grooved surfaces, but it is clear that the legs can also transmit a fraction of the force. As an example, in the variant illustrated in FIGS. 20 and 21, the legs E1-2 have the same tangential support as grooves P11, so the transmission of tangential forces between sprocket P1 and supporting structure S is equally split between the legs E1-2 and the grooves P11.

In this realization, the number of grooves P11 is lower than in other illustrated realizations, but their radial extension is larger, even below the base diameter of the second sprocket DB2 or legs E1-2, so a similar surface for tangential force transmission can be obtained.

With this configuration, the average diameter of grooves D1 is below the teeth T1, and closer to the base diameter of the second sprocket DB2, which can result in sprockets not as light as in other alternatives. However, this configuration can present advantages in the fabrication of the supporting structure S, in which the specific grooving for each sprocket S1 can result simpler due to a larger radial extension of the grooves of the sprocket and considering that only some tangential support is necessary as it has been explained above. Therefore, in FIG. 21 a conical supporting structure S is illustrated with similar lowered surfaces in the support area of grooves S1 and legs P13.

In one non-illustrated variant of this realization, all grooves P11 that reach below the base diameter of the second sprocket DB2, would have an axial abutment for the second sprocket P2, i.e. all grooves P11 would become legs E1-2, so it could be said that the transmission of tangential forces would be exclusively done by the legs E1-2. This has implications in the definition terms of the invention, as it is necessary to consider the legs E1-2 as part of the grooves P11 for this particular case. However, in terms of operation, it can be said that both solutions would be totally equivalent with the same construction and operation principles.

Figure 22:
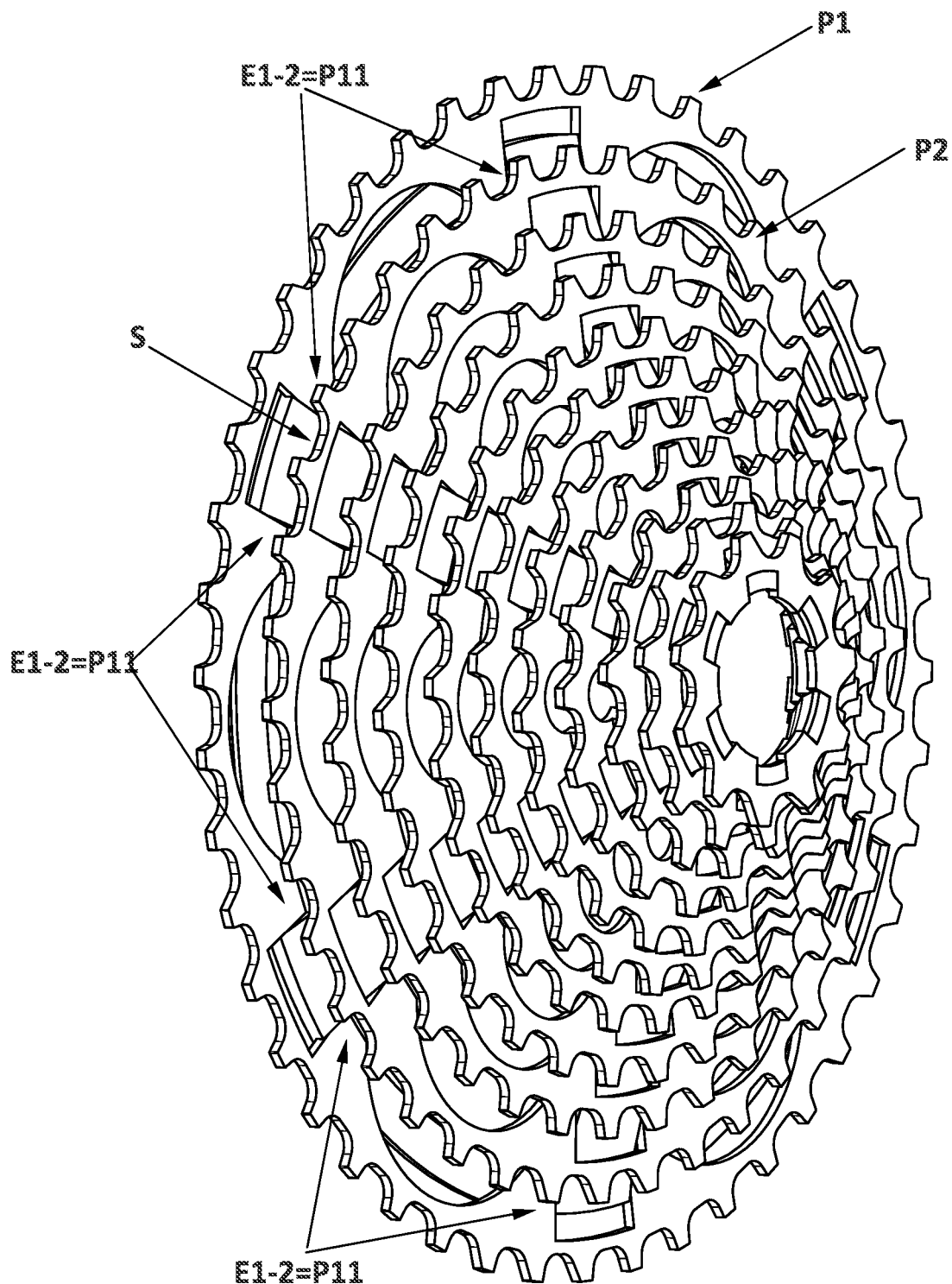
FIG. 22 is a perspective of an alternative configuration.
Figure 23:
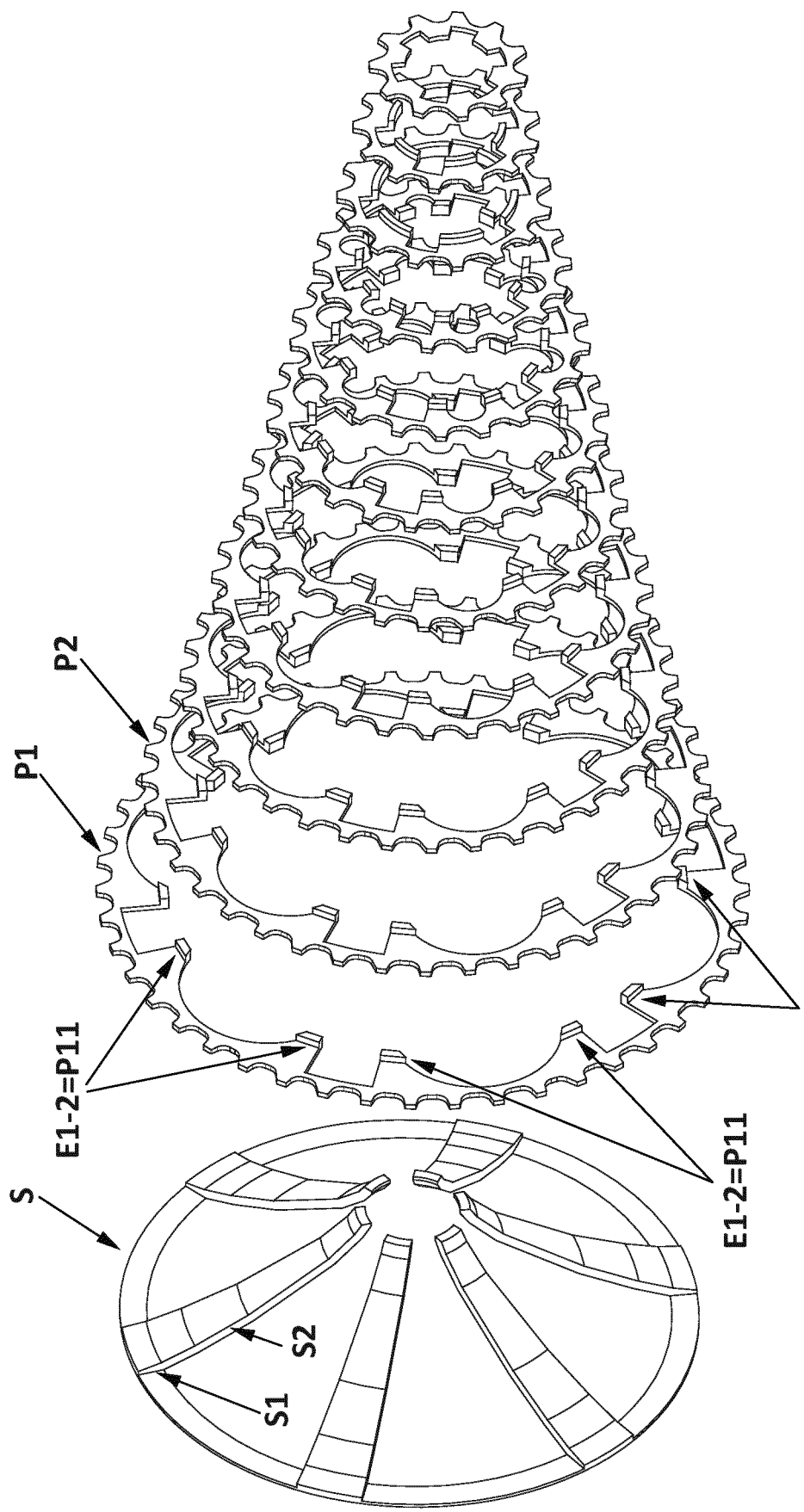
FIG. 23 is a disassembly in perspective of the alternative configuration in FIG. 22.

In FIGS. 22 and 23 another possible realization is illustrated which is based in the same construction and operation principles describes in this invention. It is a configuration in which the grooves P11 for the transmission of tangential forces exclusively conform the legs E1-2, in a similar way as in the previous case described.

Figure 20:
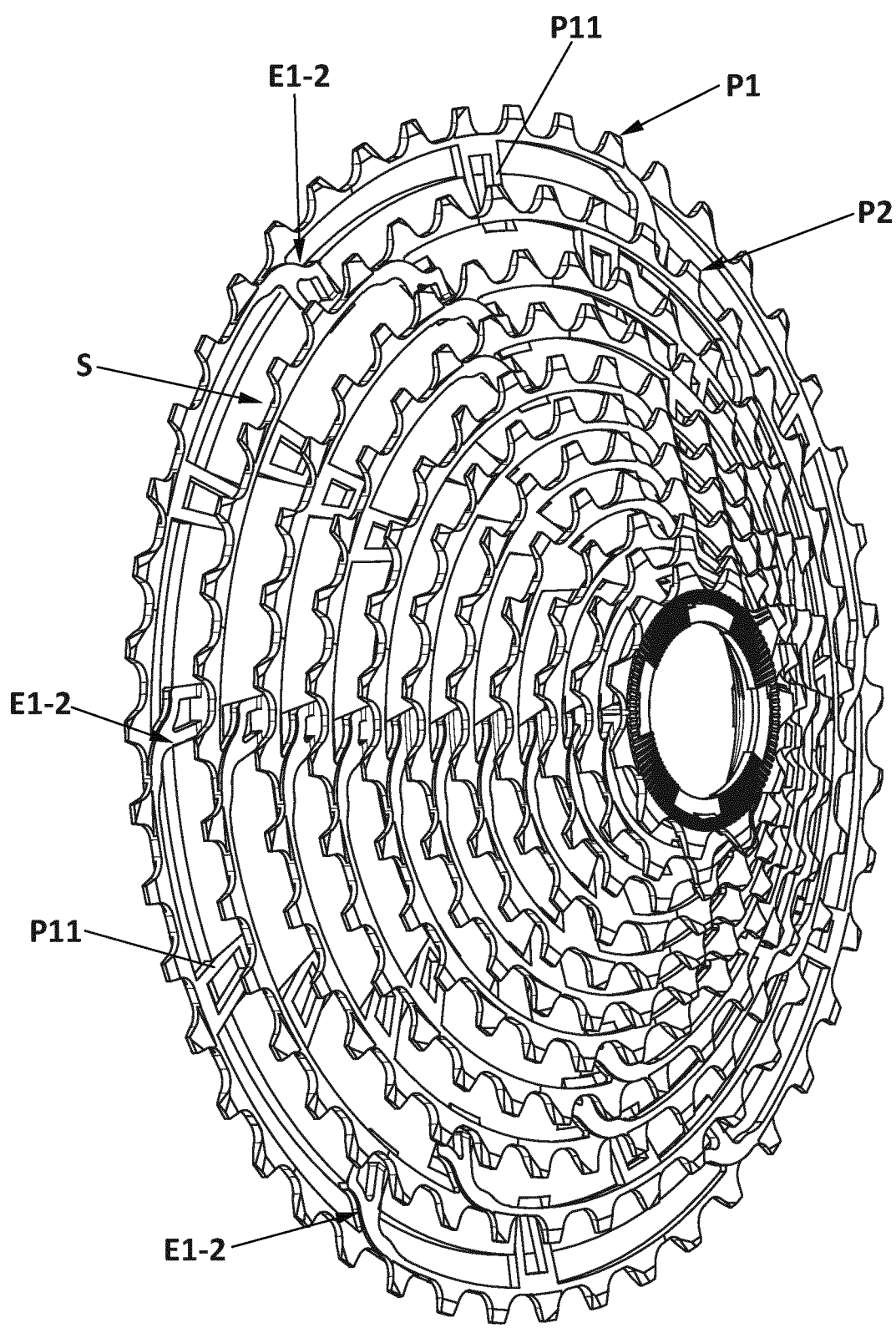
FIG. 20 is a perspective of an alternative configuration.
Figure 21:
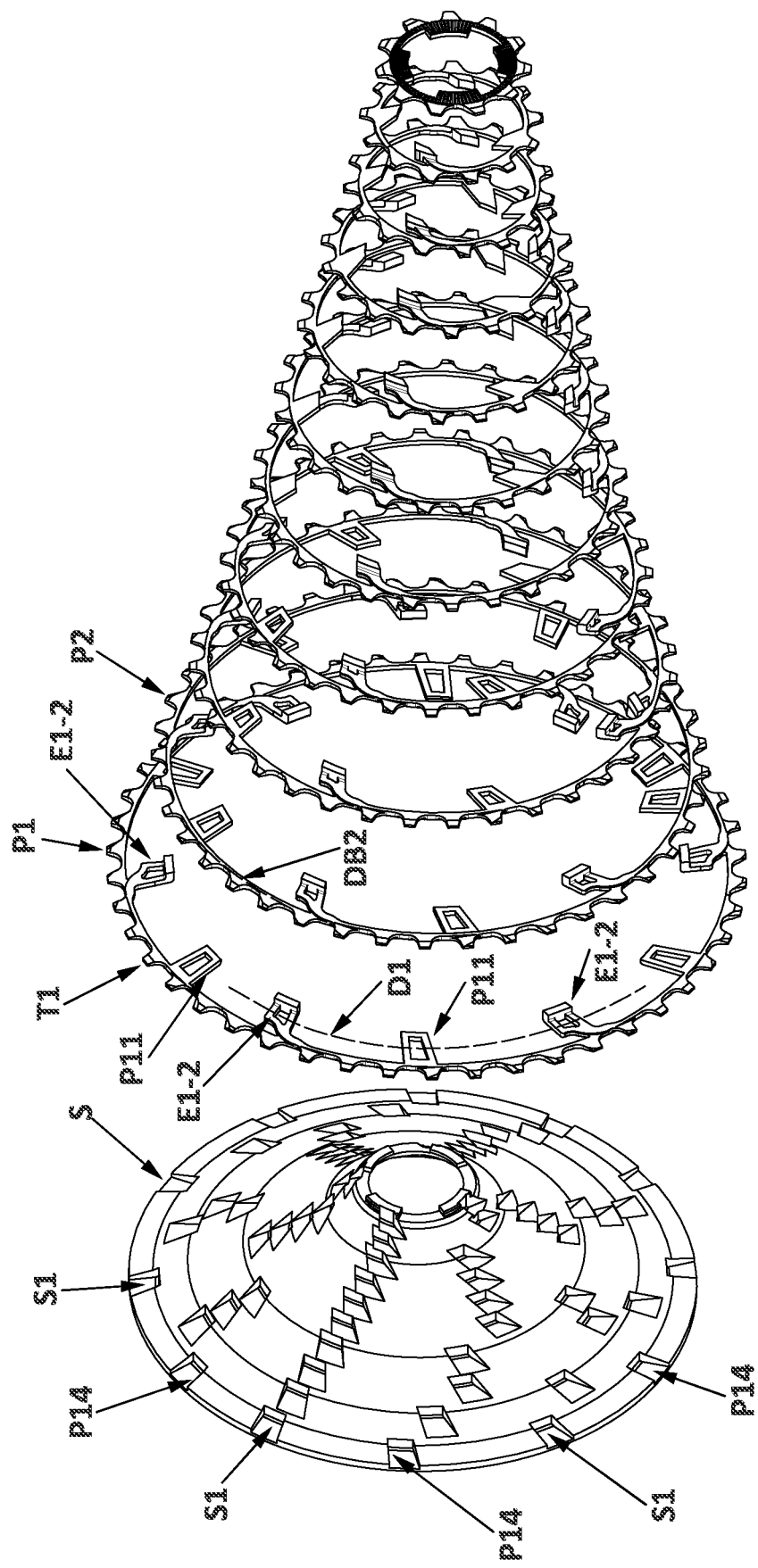
FIG. 21 is a disassembly in perspective of the alternative configuration in FIG. 20.

It has the particularity of the angular width of the grooves of the sprocket P11/E1-2 to be larger than the angular width of the support grooves S1, S2, contrary to for example the realization in FIGS. 20 and 21, and that the grooves of the support S1, S2 of the different sprockets P1, P2 angularly coincide, so that the grooves have continuity in the supporting structure S giving the sense of a single grooved surface for all the sprockets. However, each sprocket P1, P2 has an engagement surface S1, S2 specific in this grooved surface, i.e. each sprocket must be mounted in a defined position and it is not possible alter the mounting order of the sprockets.

One detail of the larger sprockets (P1, P2 . . . ) in FIG. 23 is that the grooves P11 are lowered in their central area by a circular cut, which reduces the weight of the sprockets, but maintaining enough surface for the transmission of the axial forces which will be always lower than the tangential forces.

According to another variant illustrated in FIGS. 13 to 16, the spacers E1-2 consist in a crown C1-2 provided with radial legs P1-2, forming the crown C1-2 the part E1-2$_{inf}$ closer to the axis Γ, and forming the ends of the radial legs P1-2 the part E1-2$_{sup}$ farther from the axis Γ. Therefore, between each pair of sprockets there is a crown.

In this variant, for the same reasons as in the first variant, the larger sprocket is provided with housings H1-2 for housing the farther part E1-2$_{sup}$ of the radial legs, so that any interference with the chain is avoided.

According to another advantageous aspect of the invention, applicable to both variants as illustrated in detail in FIG. 7, but preferentially to the first variant, the spacers E1-2, E2-3, E3-4 . . . comprise a bearing surface E1-2S for bearing the chain in the chain shifting processes from the second sprocket P2 to the first sprocket P1.

As it is shown in FIG. 2, the area of the spacer E1-2$_{inf}$ closer to the axis Γ angularly coincides with the part of the grooved surface P21 of the second sprocket P2 closer to the axis Γ. Therefore, the end of the leg is located at a point closer to the axis, where it interferes less with the chain.

Another advantageous aspect of the invention, illustrated in FIG. 3 and in the detailed view in FIG. 10, the sprockets have some abutments Q2-1, Q3-2, Q4-3, which prolong the grooved surface P21, P31, P41 in the direction of the larger neighbouring sprocket.

In this manner, the tangential forces between sprockets and supporting structure S are distributed over a larger surface, reducing local tensions, which allows a longer lifetime of the parts or transmitting higher torques.

Figure 18:
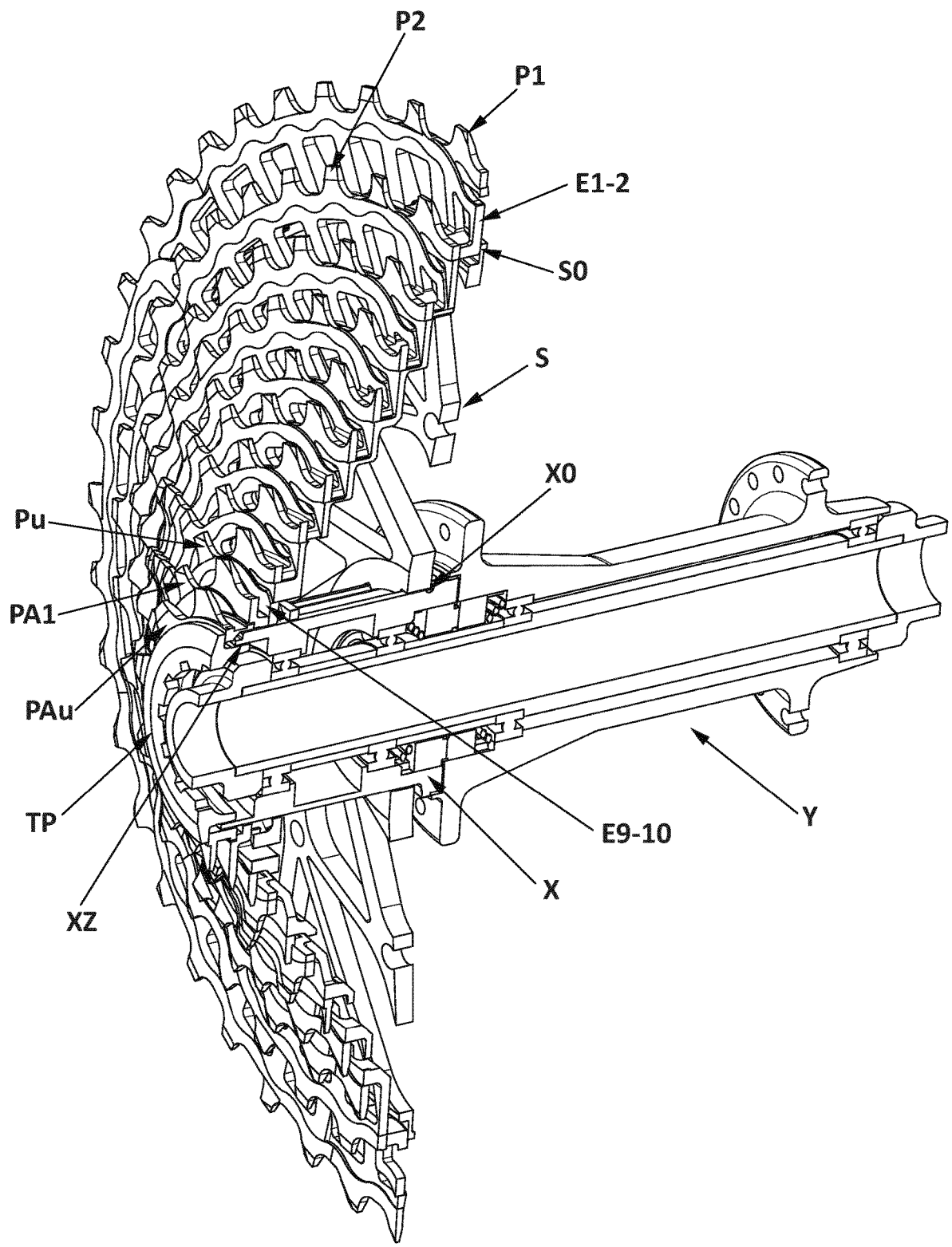
FIG. 18 shows a perspective with an axial cross-section of a cassette in configuration of cassette.

As it is shown in FIG. 17 or 18, the cassette comprises a cover TP for closing and applying pressure.

As shown in FIG. 17, the supporting structure S extends as a freewheel body X of the wheel and comprises an axial abutment S0 in its innermost part for the first sprocket P1, and joining means SZ in its outermost part for the fixation, by a thread in this case, of a closing cover TP over the last sprocket Pu.

When screwing the cover TP on the joining means SZ of the supporting structure S, an axial pressure is exerted over the sprocket Pu which is transmitted by the spacer E10-11 to the sprocket P10, which transmits it to sprocket P9 by the spacer E9-10, and successively until the sprocket P1 receives the axial preload by the spacer E1-2 and transmits it to the axial support S0 of the supporting structure closing the chain of forces, so that by means of the preload applied to the cover TP the fixing of all the sprockets P1 to Pu respect to the supporting structure S can be realized. It is an analogous fixation system to the currently most extended one, with the difference that the freewheel body X of the wheel has specific grooves to allocate the sprockets P1 to Pu in this invention. This new freewheel body X proposed in this invention must be associated with a specific wheel so compatibility with existing wheels in the market will be limited. However, in the future, with the implication of wheel manufacturers, this is the configuration that better exploits the lightening and cost advantages described in this invention.

Figure 19:
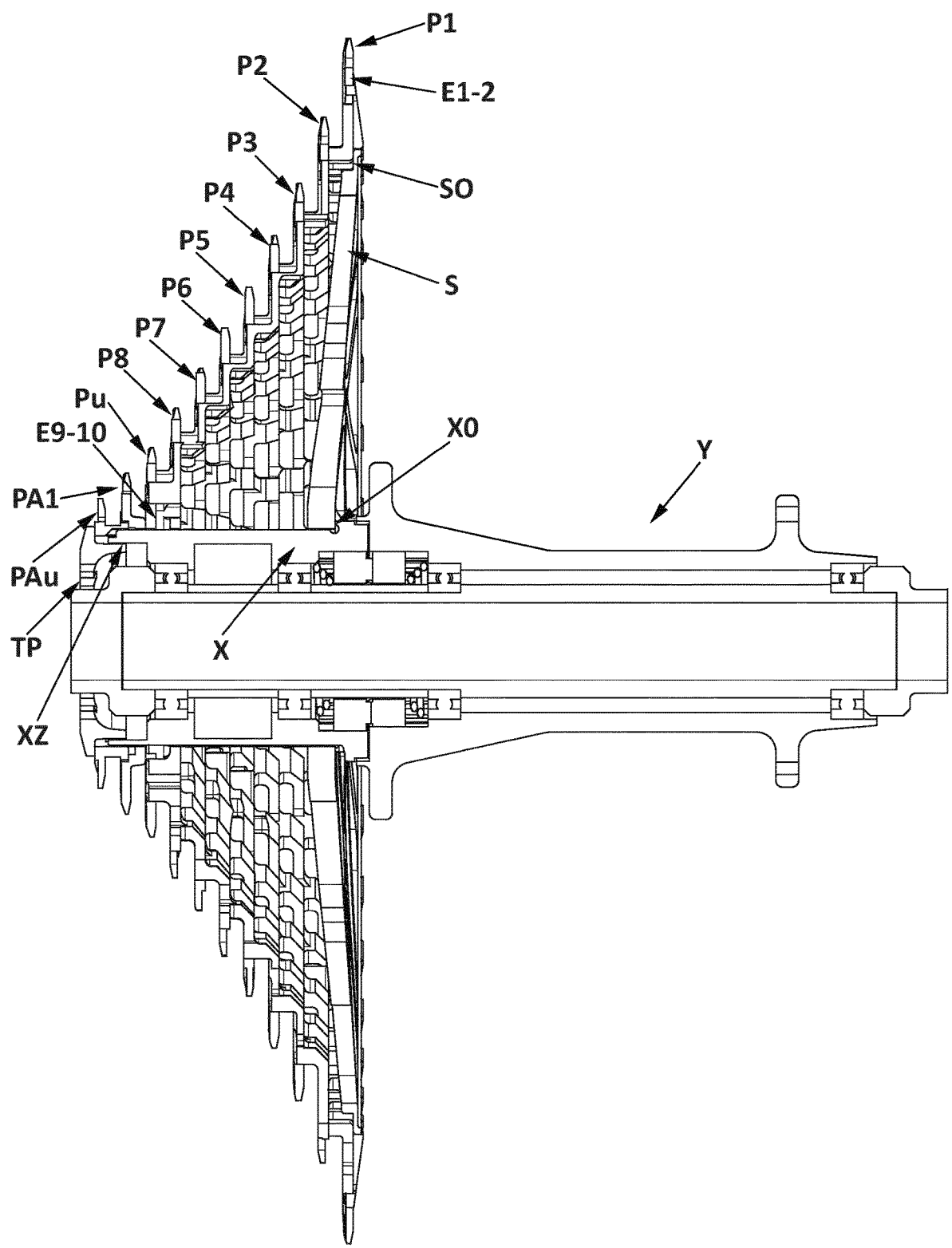
FIG. 19 shows an elevation view with an axial cross-section of a cassette in configuration of cassette.

However, FIGS. 18 and 19 show an implementation in which the supporting structure S has engagement grooves oriented towards the axis Γ complementary to grooves of the freewheel body X of the wheel and contacts with an axial abutment X0.

This axial abutment consists in a ledge X0 of the freewheel body in its farther part from the cover TP, i.e. in the part closer to the wheel. The supporting structure S comprises also an axial abutment S0 for the first sprocket P1, and on the last sprocket Pu that is engaged in the supporting structure S, axially abuts a first additional sprocket PA1 which is directly mounted on the grooves of the freewheel body X of the wheel Y. It is obvious that there could be more additional sprockets.

When screwing the cover TP on the joining means XZ of the freewheel body X, an axial pressure is exerted over the last additional sprocket PAu that is transmitted up to the first additional sprocket PA1 of similar shape as configurations in the state of the art, so that this first additional sprocket PA1 can transmit this axial pressure up to the last sprocket Pu which is in the supporting structure S. Then this last sprocket Pu transmits the pressure by means of the spacer E8-9 to sprocket P8, and successively until reaching the sprocket P1 which receives this axial preload by means of the spacer E1-2 and transmits it to the axial abutment S0 in the supporting structure, so that the supporting structure can finally exert axial pressure against the axial abutment X0 of the freewheel body X and close the chain of forces.

The additional sprockets PA do not make contact with the supporting structure S in any case. They contact the last sprocket Pu, transmitting the forces to the rest of the sprockets and it is the first sprocket P1 the only one transmitting axial forces to the supporting structure S.

In this manner, by means of the preload applied in the cover TP it is possible to fix all sprockets P1 to Pu, the additional sprockets PA1 to PAu and the supporting structure S respect to the freewheel body X. The fixation method is analogous to the previous case and to the most extended method currently. In fact, the system is mounted on the most common freewheel body in the state of the art, which implies maximum compatibility with the existing wheels in the market, which is an advantage. In this case the supporting structure S works as an adapter between the geometry of the current freewheel body and the geometry of the preferred freewheel body. The supporting structure S would be associated to the freewheel body working as if they were a single part, and in case of wear of the sprockets, only the sprockets would be substituted with no need of substituting the supporting structure, so that the advantages in terms of cost would be similar to the previous configuration. This way, this is a transient configuration with greater initial acceptance in the market until freewheel bodies with the appropriate geometry are developed to optimally exploit the advantages described in this invention.

Figure 6:
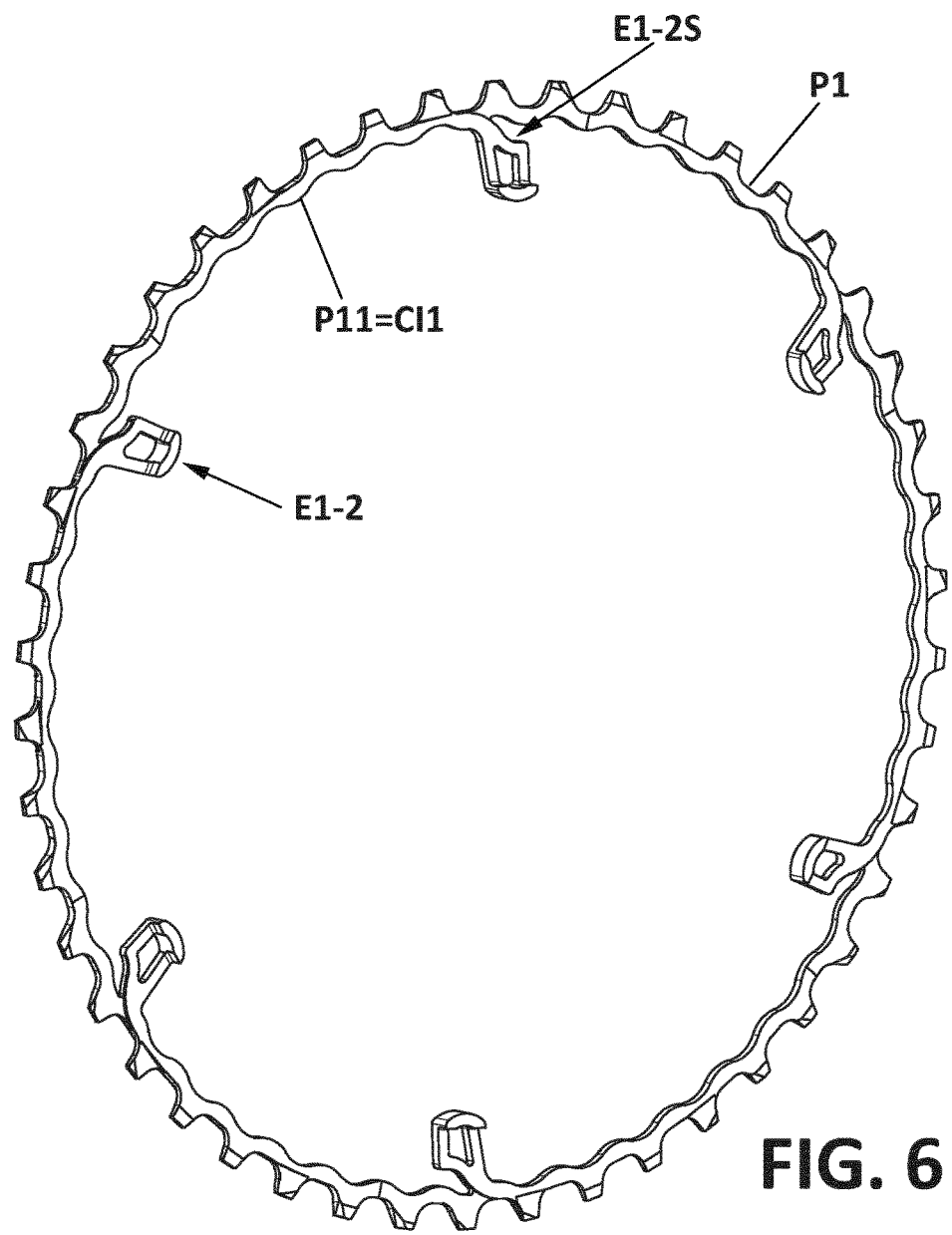
FIG. 6 shows a sprocket according to the invention, isolated.

As it is shown in FIG. 6, the invention also refers to a sprocket P1 for a cassette 1 similar to the one illustrated in FIGS. 1 and 2.

In this sprocket P1 an outer edge CE1 configured by the teeth T1 and an inner edge CI1 are defined, being the inner edge CI1 configured by a surface P11 oriented to engage in a structure S for supporting provided with a surface S1 for complementary assembly with surface P11, being defined in the sprocket an axis Γ, and which comprises at least an spacer leg E1-2, E2-3, E3-4 . . . oriented to establish a separation with a second sprocket P2, having the spacer leg a part $E1\text{-}2_{inf}$ closer to the axis Γ and a part $E1\text{-}2_{sup}$ farther from the axis Γ, extending the spacer leg E1-2 at least from the surface P11 towards the axis Γ, such that a part closer $E1\text{-}2_{inf}$ to the axis Γ of the spacer leg E1-2 can act as an abutting spacer with a second sprocket P2 whose base line B2 has a smaller diameter DB2 than the average diameter D1 of the surface P11 of the sprocket P1.

Preferentially, in this sprocket the spacer legs E1-2 comprise a bearing surface E1-2S for bearing the chain in the chain shifting processes from the second sprocket P2 to the first sprocket P1.

Even more preferentially, the surface P11 is grooved in the inner edge CI1, so that tangential forces T can be transmitted between the sprocket and the structure S for supporting.

Finally, as shown in FIGS. 17 to 19, according to another aspect of the invention a cassette 1 for a bicycle transmission system is described, which comprises at least a sprocket P1 and a structure S for supporting of the sprocket P1, being defined in the sprocket P1 an outer edge CE1 configured by its teeth T1 and an inner edge CI1 oriented towards the axis Γ, being the inner edge CI1 of the sprocket P1 configured by a grooved surface P11, being the structure S for supporting provided with one surface S1 for complementary assembly with the grooved surface P11 of the sprocket P1, such that tangential forces T can be transmitted between the sprocket and the structure S for supporting, comprising the sprocket an axial contact on the structure S for supporting, characterised in that the axial abutment S0 on the structure S for supporting is located between the surface S1 for complementary assembly and the axis Γ.

In the present text, the word "comprise" and its variants (such as "comprising", etc.) should not be interpreted in a excluding way, i.e. they do not exclude the possibility that what is described includes other elements, steps, etc.

The invention is not limited to the specific realizations that are described but covers also, for example, the variants that can be realized by the average expert in the matter (for example in terms of material selection, dimensions, components, configuration, etc.), in what can be deduced from the claims.

What is claimed is:

1. A cassette for a bicycle transmission system, comprising:
   a first sprocket provided with a plurality of teeth and a second sprocket provided with a smaller number of teeth than the first sprocket and mounted on an axis common to the first sprocket, in both sprockets a base line of the teeth being defined; and a support structure for supporting the sprockets, an outer edge configured by the teeth and an inner edge oriented towards the axis being defined in the sprockets, the inner edges of the sprockets being formed by grooved surfaces, the support structure being provided with two engagement surfaces complementary of the grooved surfaces of the grooved sprockets, such that tangential forces can be transmitted between the sprockets and the support structure, the cassette comprising at least a spacer between sprockets, wherein the diameter of the base line of the second sprocket is smaller than the average diameter of the grooved surface of the first sprocket, the spacer having a part closer to the axis and a part farther from the axis, the spacer extending between the first sprocket and the second sprocket at least from the grooved surface of the first sprocket to at least the base line of the second sprocket, such that the part closer to the axis of the spacer acts as an abutting spacer with the second sprocket, while the part farther from the axis of the spacer allows to exert axial forces on the first sprocket.

2. The cassette according to claim 1, wherein at least a spacer is an integral part of the first sprocket and consists in legs joined to the first sprocket by the inner edge of the first sprocket, the support structure being provided with a housing for the legs.

3. The cassette according to claim 1, wherein an end closer to the axis of the grooved surface of the first sprocket is prolonged to at least the base line of the second sprocket, said end abutting on the second sprocket, such that it acts as an abutting spacer with the second sprocket.

4. The cassette according to claim 1, wherein at least a spacer consists in a crown provided with radial legs, the crown forming the part of the spacer closer to the axis, and the ends of the radial legs forming the part of the spacer farther from the axis.

5. The cassette according to claim 4, wherein the first sprocket is provided with housings for housing the ends of the radial legs.

6. The cassette according to claim 1, wherein the spacers comprise a bearing surface for bearing a chain in the chain shifting processes from the second sprocket to the first sprocket.

7. The cassette according to claim 1, wherein the part of the spacer closer to the axis angularly coincides with an end of the grooved surface of the second sprocket, the end of the grooved surface being an end closest to the axis.

8. The cassette according to claim 1, wherein the second sprocket has protrusions which prolong the grooved surface in the direction of the first sprocket.

9. The cassette according to claim 1, which comprises more than two sprockets.

10. The cassette according to claim 1, which comprises a cover for closing for cassette and providing pressure against at least the second sprocket.

11. The cassette according to claim 1, wherein the support structure extends as a freewheel body of a wheel and comprises an axial abutment in its innermost part for the first sprocket, and joining means in its outermost part for fixing a closing cover on a last sprocket.

12. The cassette according to claim 1, wherein the support structure has grooves oriented towards the axis complementary to grooves of a freewheel body of a wheel, and contacts an axial abutment, said axial abutment being one ledge of the freewheel body in its part farther from a cover, comprising also the support structure an axial abutment for the first sprocket, and wherein on a last sprocket which engages the support structure, axially abuts a first additional sprocket, which is directly mounted on the grooves of the freewheel body of the wheel.

13. The cassette according to claim 1, wherein the material of the sprockets has a hardness greater than the material of the supporting structure.

\* \* \* \* \*